United States Patent
Weber

(10) Patent No.: US 7,564,143 B1
(45) Date of Patent: Jul. 21, 2009

(54) STAGING OF TIDAL POWER RESERVES TO DELIVER CONSTANT ELECTRICAL GENERATION

(76) Inventor: Harold J. Weber, P.O. Box 169, Centerville, MA (US) 02632-0169

( * ) Notice: Subject to any disclaimer, the term of this patent is extended or adjusted under 35 U.S.C. 154(b) by 95 days.

(21) Appl. No.: 12/005,083

(22) Filed: Dec. 26, 2007

(51) Int. Cl.
F03B 13/10 (2006.01)
(52) U.S. Cl. ................. 290/42; 290/53; 60/398
(58) Field of Classification Search ......... 290/42, 290/53; 60/398
See application file for complete search history.

(56) References Cited

U.S. PATENT DOCUMENTS

| | | | | |
|---|---|---|---|---|
| 1,507,461 | A * | 9/1924 | Chase | 405/26 |
| 3,426,540 | A * | 2/1969 | Fixel | 405/77 |
| 3,974,395 | A | 8/1976 | Bright | 290/44 |
| 3,993,913 | A * | 11/1976 | Dickman | 290/53 |
| 4,078,871 | A * | 3/1978 | Perkins, Jr. | 417/100 |
| 4,141,670 | A * | 2/1979 | Russell | 415/3.1 |
| 4,263,516 | A * | 4/1981 | Papadakis | 290/53 |
| 4,317,330 | A * | 3/1982 | Brankovics | 60/398 |
| 4,464,080 | A * | 8/1984 | Gorlov | 405/76 |
| 4,859,866 | A * | 8/1989 | Horne et al. | 290/54 |
| 5,686,766 | A | 11/1997 | Tamechika | 307/43 |
| 5,955,790 | A * | 9/1999 | North | 290/53 |
| 6,133,644 | A * | 10/2000 | Smith et al. | 290/53 |
| 6,969,925 | B2 * | 11/2005 | Desy et al. | 290/54 |
| 7,040,089 | B2 * | 5/2006 | Andersen | 60/398 |
| 2005/0073153 | A1 * | 4/2005 | Brewington | 290/53 |
| 2009/0102199 | A1 * | 4/2009 | Voropaev | 290/53 |

FOREIGN PATENT DOCUMENTS

| | | | |
|---|---|---|---|
| DE | 3107138 A1 | * | 9/1982 |
| JP | 57070958 A | * | 5/1982 |
| JP | 63161212 A | * | 7/1988 |

OTHER PUBLICATIONS

IET (UK) Factfile, "Hydroelectric Power", www.theiet.org/factfiles (downloaded PDF and HTM files of this publication provided by inventor on a floppy diskette).
IET (UK) Factfile, "Tidal Power", www.theiet.org/factfiles (downloaded PDF file of this publication provided by inventor on an enclosed diskette).
"Wind park is Malmo's marvel", Mark Landler, The New York Times, [Cape Cod Times Newspaper, Vo. 70, No. 281, Friday Nov. 23, 2007, pp. A-1,A-8.

* cited by examiner

Primary Examiner—Joseph Waks

(57) ABSTRACT

Oceanic tidal energy sources hydroelectric generating system coupled to a primary tidal basin through a bi-directional tideway exciting a turbine as a diurnal cycle tide waxes and wanes. A secondary tidal basin includes a tideway and turbine with flow modulated by a regulator gate to proportionately blend reserve tidewater capacity of the secondary tidal basin as a delayed resource compensating a slacking of the primary tidal flow with a graduated secondary tidal basin influx or outflow providing an aggregate summation of tidal energy acting upon the turbines to continuously drive generators and deliver a constant flow of electric power throughout the diurnal tidal cycle. Shunting excess tidal energy around the turbines during periods of reduced electric power demand furthers a full capacity of tidal resources in subsequent phases of the diurnal tidal day when solar day related power demand may increase.

19 Claims, 27 Drawing Sheets

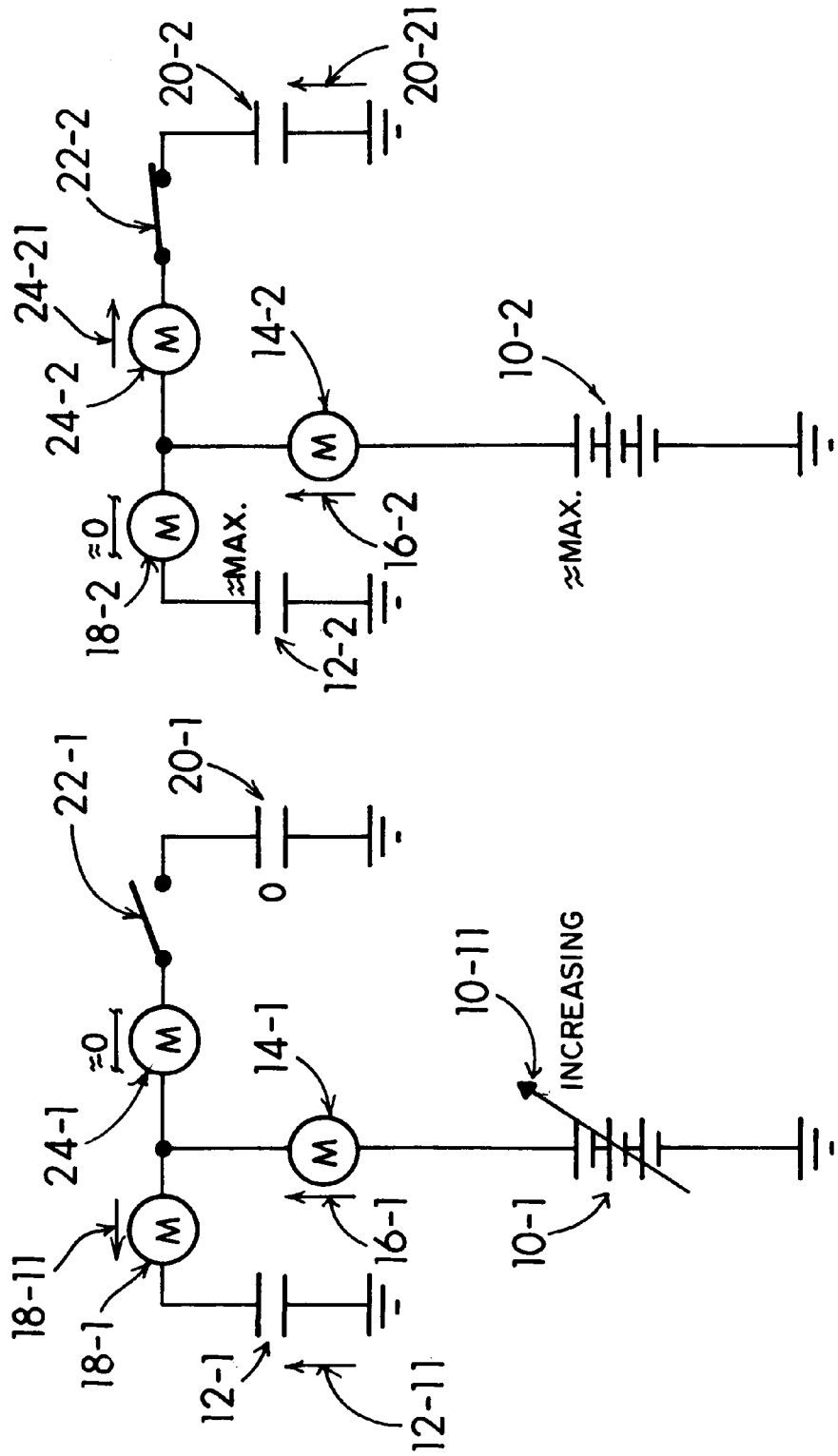

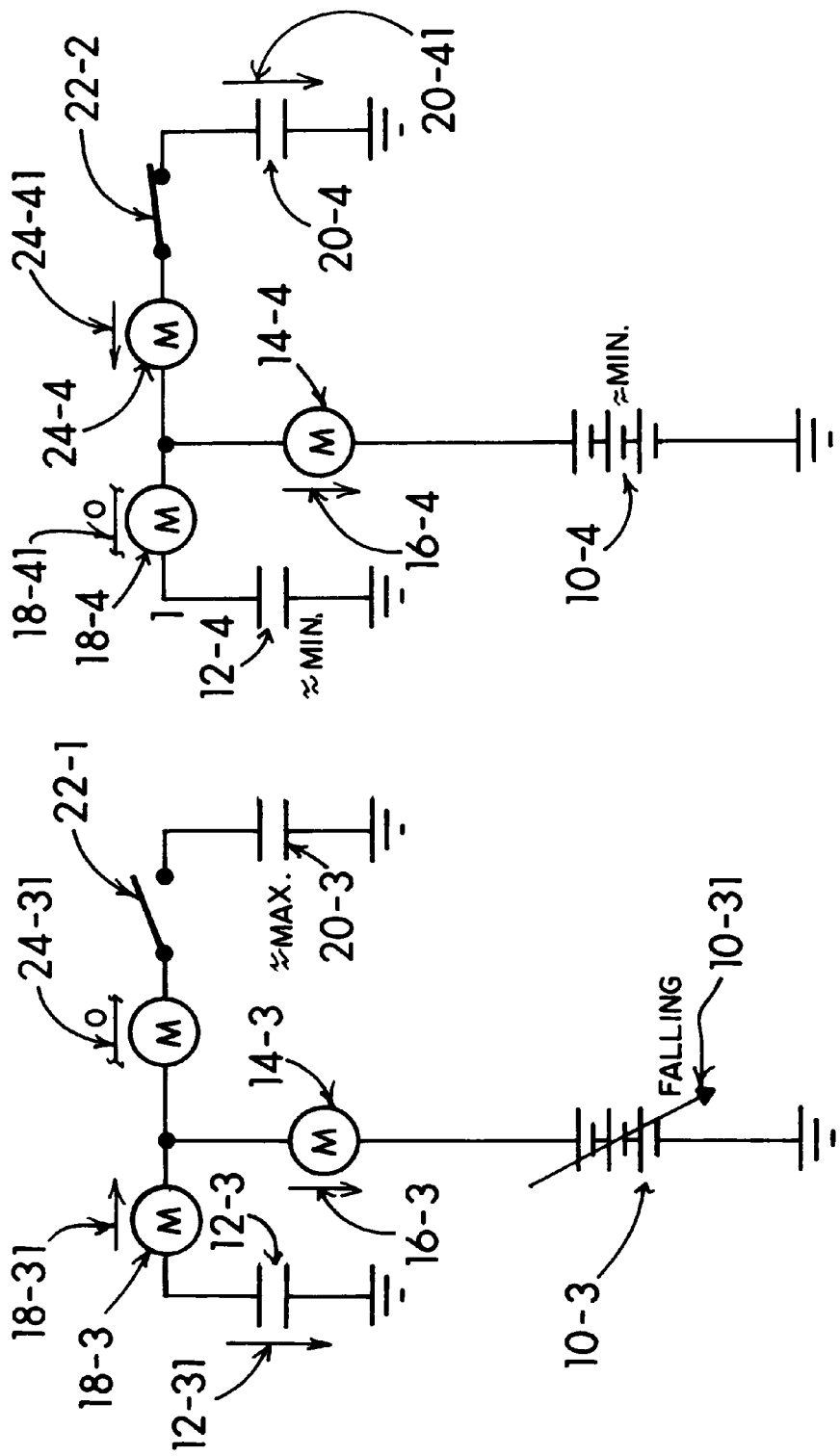

STAGING OF TIDAL POWER RESERVES TO DELIVER CONSTANT ELECTRICAL GENERATION

FIELD OF INVENTION

My invention generally pertains to a hydroelectric generating system utilizing turbines to capture latent energy from a natural bi-directional flow of oceanic tidal currents. More particularly it pertains to obtaining a constant level of turbine excitation throughout the influx, reflux and two slack-water portions of a diurnal tide cycle.

INVENTION SYNOPSIS

In my invention's operating scenario, a turbine apparatus combines to utilize a predictable inflow and outflow of a tidal current to drive one or more generators and produce a steady flow of electricity throughout the tidal current's usual diurnal cycle. During tidal current inflow a primary turbine apparatus is driven by a rising tide's floodstrength current passing through a primary tideway and entering a tidal basin or estuary maintained as a primary reservoir behind a barrage. An onset of a slack before ebb urges a regulated opening of a regulator gate to enable an artificial tidal inflow current into a lower-level secondary reservoir basin or collateral estuary through a secondary tideway including a secondary turbine. A sufficient resumption of an ebb tide enables an outflow ebb strength current to exhaust from the primary reservoir and through the primary tideway to again be utilized by the primary turbine, together with a proportioned closure of the secondary reservoir's regulator gate. During the period of slack tide before flood an artificial tidal outflow current increasingly flows forth from the stored higher-level of the proportionately un-gated secondary reservoir basin's reserves through the secondary turbine for the duration of the ebb tide slack time. Finding a resumption of the flood current after ebb slack serves to again control closure of the secondary reservoir's regulator gate, preserving its lowered capacity for receiving the artificial tidal inflow current once high tide slack water occurs. The to-and-fro action of the tidal flood and ebb serves to deliver energy from the primary turbine and generator while energy flow during the tidal slack periods is supplied by the control of artificial outflow and inflow tidal currents created by an emptying and filling of the secondary reservoir through a timely control of the regulator gate. The resulting artificial tidal current is utilized to drive the secondary turbine and generator thereby maintaining a substantial uniformity of overall power production. The overall performance is embellished by the modulated opening and closing of the regulator gate in the secondary tideway in proportion to an immediate measured level of tide drift through the primary tideway. The proportionated regulator gate operation results in a nearly steady exchange of water flow rate through the turbine apparatus thereby enabling a stable and about constant delivery of electrical power by the turbine driven generator system throughout a full diurnal cycle of operation.

A usage-history based prediction of electrical power demand may be formulated and the resulting determination may be utilized to shunt some of the oceanic tidal flow around the turbine apparatus during periods of lessened demand, thereby assuring full capacity availability later in a diurnal cycle when demand may predictably increase. Knowing that the diurnal cycle does not coincide with a solar day it is clearly advantageous that peak electrical demand relative with the periods of maximal tidal drift may be controllably skewed by a determinable extent from day to day. The problematical non-synchronous relationship between tidal drift and electrical demand beget the technique unveiled by this invention for migrating some of the tidal water capacity around the turbine apparatus during periods of lowered demand allows for full capacity operation to be available during periods of increased demand.

BENEFITS OF INVENTION

Of all the sources of renewable power generation, hydroelectric power has long been recognized as the most dependable. In contrast to wind power with it's erratic and unpredictable non-cyclic behavior, water power may be reliably managed to be steady and predictably available throughout a 24 hour day. This invention efficiently captures oceanic tidal flow energy as a hydrodynamic source and conveys a teaching that adapts the cyclic nature of tidal drift into a commercially viable source of virtually constant hydroelectric power generation.

A main goal and hence a key benefit to a user of my invention presently pertains to a capability for utilizing the natural flow of tidal energy as a source of essentially unlimited and recoverable hydrodynamic energy harnessed for generating environmentally-clean electricity. Tidal energy is inherently non-polluting and clean in that no nasty byproducts or unnatural emissions are released into the habitat or atmosphere by it's utilization. Tidal energy itself is primarily derived from the cognate gravitational interaction between the planet earth, earth's moon and the Sun and is therefore a long-known cyclic "constant" with mensurably knowable parameters and predictable behavior. The cyclic nature of tidal energy leads to a nearly sinusoidal presentation of power potential during a tidal day. This invention addresses the natural characteristics and serves to better "average-out" the crest and valley character of tidal energy cycle into a more dependable and continuous source of economically feasible electricity that may "best fit" the irregular commercial needs of a solar day of energy demand activity.

PROBLEM SOLVED BY INVENTION

Tidal energy is known as a nonpolluting naturally occurrent renewable source of energy having a minimal impact on the earth's environmental habitat. Man is well known to have ever-increasing energy needs. In today's world, most of these needs are met by hydroelectric damming of rivers, fossil fueled power stations (e.g., oil, coal or natural gas fired generator systems), nuclear power stations and, to a lesser extent, by geothermal power and wind driven turbines. Tidal energy has heretofore seen limited application because in it's rudimentary form it suffers from inherently producing non-uniform albeit cyclical surges of energy delivery during only about ten hours of the tidal-day. Although duration of flood tide rise and duration of ebb tide fall is ordinarily a predictable diurnal cycle, there is little if any correlation between the tide day cycle and a solar day's commercial demand cycle for electricity. As a result other means such as fossil fueled power stations are necessary fill-in during times of tidal slack water.

Having a diurnal (tide day) cycle of calculable magnitude and timing is remarkably superior to sporadic climatic variations deleteriously affecting wind-power or even solar-cell power that are known to suffer from unpredictable surges that often outstrip immediate customer demand. Tidal occurrence is inherently less remarkably affected by "natural disturbances" such as hurricanes, inclement weather, wild fires, volcanic ash spewed into the atmosphere or other sporadic disturbances that are likely to disrupt other sun or wind based sources of renewable energy. Even the eventual labor-intensive production of ethanol as a source of quasi-renewable energy is highly dependent upon a non-failing and consistent production of stock-crops used for the distillery process.

A primary advantage of oceanic tide energy management is that latent energy intrinsic to oceanic tide may be temporarily stored-up and subsequently utilized when tidal slack occurs. In an analogical sense, this is comparable to storing excess energy in a capacitor and then recovering the latent energy to average-out an overall systematical power flow in a controllable proportion to load demand. This invention furthermore teaches a practical utilization of an artificial tidal flow during the usual diurnal slack time to maintain a nearly constant source of energy. It advances the art by modulating the "store" of energy capacity for metered release as a delayed tidal current having a predetermined reserve of latent energy capacity. The result is an optimal flow of tidal drift current through the turbine apparatus that best reflects the immediate demands of the solar day of commercial energy consumption. The extent of this compensatory energy capacity modulation may be extended to differ throughout the usual week of solar days and even corrected for special variations such as likely increased air-conditioning usage during periods of hot weather, demand reduction due to a holiday, and similar measurable or predictable events.

I show how the time-skewed or cyclic phase delay of a utilization of the secondary tidal source reserve may be controllably blended with the primary tidal source to deliver what amounts to an about constant level of the turbine energy and generator performance thereby yielding a nearly steady supply of electrical power.

Adapting to Portable Energy Needs

A large-scale replacement of the vehicular fleet with "electric" cars and trucks in order to obtain better fuel economy does little to overcome the basic energy problem. Electric vehicles merely shift an inherent problem to another business sector. The gas or diesel sloshing around in the vehicle's "gas tank" becomes a requirement for similar energy-equivalent quantities of "fuel" at a central location, for example the fossil-fuel fired electric generating station. In an electric (or hybrid) vehicle, the electric power is obtained from a battery that must be regularly "charged-up" from a stationary source. This is to say that every kilowatt of electricity demanded for propelling an electric vehicle must be generated somewhere by some usually stationary power station apparatus. It is known that, at the time of this invention, a bulk of this electricity is generated by non-renewable resources, such as coal, oil or natural gas. Hence the thesis that under current art, electric cars merely shift the inherent energy distribution problem from the mobile fuel supplier to the stationary fuel supplier business sector.

Energy produced by this invention's tidal power generator implementation may be commercially distributed and delivered to provide a source of battery charge-up current flow for many vehicles. Dependence upon tidal currents produces an almost perpetual source of energy that is cyclic and predictable and fully applicable to the needs of vehicular battery recharge without directly or indirectly contributing to the deleterious effects of global warming and consumption of vital organic commodities that might be better utilized for other purposes, such as animal or human food.

SUMMARY OF INVENTION

A new level of tidal energy capture and utilization is a poignant aspect of my invention's teachings. In essence, it converts the energy component from a measured flood and ebb portion of a contained primary tidal current flow into hydroelectric power. During two interposed periods of tidal drift slackening, a secondary provision for maintaining a virtual tidal current is implemented to maintain a manageably even flow of hydroelectric power from the system. Relative with the quasi-sinusoidal measure of the natural oceanic tide cycle of the primary tide, the virtual tidal current technically appears as though it were a phase-delayed or time-shifted tide blending with the primary tide and acting to smooth-out the natural dips in the primary tide's drift energy release during quarterns of slack tide.

Main Turbine Drive

This invention is exercised by providing two tidal basin reservoirs partially contained by a barrage. A primary basin is allowed to ordinarily fill and empty from the oceanic tidal source through a primary tideway, with the bidirectional tidal current set providing hydrodynamic energy for driving a primary (main) turbine apparatus.

First Augmentation Event

A separate augmentative secondary basin (having previously been lowered) is held-back from filling through a secondary tideway channeled with the oceanic tidal source. Drift set through the secondary tideway is managed by a regulatory sluice. When the main basin's tideway flood strength is sufficient to fully drive the primary turbine apparatus the regulator gate is closed. As the current drift through the main basin's tideway wanes preceding the period of after-flood slack current, the regulator gate is gradually opened allowing a continued influx of a delayed tidal current through a secondary tideway coupled between the oceanic source and the secondary basin. The gradation of regulator gate's opening is proportioned to about match the decrease in the tide drift through the primary tideway with a corresponding increase in the delayed tide drift through the secondary tideway.

The invention instructs the advantageous dynamic measurement of the primary tideway current and proportionately opening the regulator gate so as to increase the tidal flow through the secondary tideway as the tidal flow measure through the primary tideway wanes.

Event Continuations

During the after-flood slack portion of the first augmentation event the inflow of the secondary tidal flood allowed by the gradually opened regulator gate serves to mostly fill the secondary basin concurrent with utilizing the secondary tidal drift through the secondary tideway to drive the secondary turbine apparatus and produce viable power during the interval of the waning and slack flood tide. As the tide begins to ebb, the ebbing outflow current once again serves to drive the primary turbine apparatus until an onset of the after-ebb slack-water condition is reached.

Second Augmentation Event

The separate secondary basin is mostly filled during the period of secondary tidal flood allowed by opening the regulator gate during the period of after-flood slack water. This filling occurs during the earlier described First Augmentation Event. The secondary tideway's regulator gate is gradually closed in proportion an a marked increase in the primary tideway's ebb-tide's current flow. The regulator gate is fully closed once the primary ebb drift is sufficient to drive the primary turbine apparatus from the primary basin's reserves flowing into the ebbing oceanic source. Upon a waning of the ebb drift, the secondary tideway's regulator gate is again gradually opened and the held-back water in the augmenter basin proportionately flows-forth to create the delayed ebb-tide flow which routes through the secondary tideway to effectively drive the secondary turbine apparatus for the duration of the after-ebb slack.

The invention further reveals a continuance of the dynamic measurement of the primary tideway current and proportionately closing the regulator gate so as to decrease the tidal flow through the secondary tideway as the tidal flow measure through the primary tideway waxes.

Compensatory Events

By a programmed determination of the graduated opening and closing sequence of the secondary tideway's regulator gate a resulting control of the secondary tideway's current serves to maintain an overall uniformity of hydroelectric power production. A proportional closing of the regulator gate during periods of the oceanic source's flood inflow and ebb outflow exceeding a threshold of current speed diverts the tidal energy to principally operate the primary turbine through the tidal currents exchanged through the primary tideway. As the tide cycle continues, the opening of the regulator gate on the secondary basin may ramp-up the secondary tideway tidal exchange in proportion to a waning of the speed of current flow through the primary tideway. As a result, the secondary turbine output may gradually increase in near-proportion to a measurable decrease in the primary turbine's energy delivery as waning of the oceanic tide flood and ebb drift occur. The proportionated operation of the regulator gate serves to maintain a nearly constant level of hydrodynamic energy conversion through the turbine apparatus so the overall hydroelectric production may be maintained at a nearly constant level, independent from natural oceanic tide drift variations known to occur during the diurnal tide cycle.

What This Invention "Is" and "Is-Not"

This invention "is not" about a turbine drive system limited to operation only during the interval of substantial flood current flow and ebb current flow.

This invention "is not" about utilizing another non-tidal energy source to fill-in during the periods of after-ebb slack water and after-flood slack water.

This invention "is" about providing a second barraged tidal containment basin having a tideway guarded by a regulator gate to gradate the tide drift parameters in about inverse proportion to the measure of tidal drift through a primary tideway coupled between the oceanic tidal source and a primary tidal basin to achieve an overall summation of tidal drift rate through the two tideways that is nearly constant although not necessarily in the same direction.

This invention "is" about an apparatus which defers a proportional utilization of a portion of the ebb-tide and flood-tide potential until the onset of slack-tide occurs. This enables about a constant flow of the hydrodynamic energy through the turbines.

This invention "is" about converting the predictably cyclic inflow and outflow of oceanic tides into a near uniform source of hydroelectric energy.

This invention "is" about a hydroelectric tidal energy system that may be economic on various scales of magnitude and at various locales.

This invention "is" about servicing a third barraged tidal containment basin having a second regulator gate controlled third tideway for reserving tidal energy from periods of diminished energy usage to be available during periods of increased energy usage.

OBJECTIVES OF INVENTION

An objective of my invention is to produce hydroelectric energy from tidal currents produced through a tideway by a naturally occurring tidal rise and fall.

A key purpose for my invention is to availiate a primary and at least one secondary tidal current flow controllably phase-lagging the primary tidal current flow.

A purpose of my invention is to manage a diurnal cycle of tidal current so as to deliver a primary range of current drift and a subsequentially delayed secondary range of current drift that may act upon the turbine apparatus to maintain a continuous output of the hydroelectric energy throughout the full diurnal tide cycle.

A gist of my invention is to establish at least two tidal basins, including a primary basin continuously flooded and ebbed by the diurnal tide cycle and a secondary basin having a barrage ported by a regulator gate which is controlled so as to create a secondary tidal current flow through a secondary tideway.

A further gist of my invention is to proportionately delay a metering of the secondary tidal current flow through the secondary tideway so as to compensate the waning and waxing of the oceanic tidal currents through the primary tideway.

A preferred implementation of my invention dynamically measures the tidal drift rate through the primary tideway and determines an proportional extent of an opening or else closing of the regulator gate to modulate the tidal drift rate through the secondary tideway to achieve an about constant summation of tidal drift energy channeled through both tideways and driving the turbine apparatus.

The spirit of my invention is to utilize the profoundly cyclic and bidirectional oceanic tidal flow to establish a continuous source of hydroelectric power.

A further goal is to adaptively utilize the tidal current flow as an efficient and renewable source of commercially viable continuous hydroelectric energy.

It is an important intent to provide the advantages producing hydroelectric power during the inrush of tidal flooding and outflow of tidal ebbing combined with controllably delaying the dissipative usage of a portion of the available tidal energy in a proportionately metered manner to avail a continued tidal energy capability during periods of the oceanic source tide waning, waxing and slack.

Yet another consideration of my invention is to adapt oceanic tide energy to unfailingly deliver a nearly constant source of hydroelectric power throughout a diurnal tide cycle.

My invention intends that range of tidal flow be managed by skewing and graduating phase and magnitude of a utilization of a portion of the tidal rise and fall energy for maintaining a nearly constant level of hydroelectric production during the periods of slack water.

A remaining synergistic object of this invention is to manage the tidal inflow and outflow to match the cyclic variations in loading placed on the hydroelectric generators as related to varying periods and levels of commercial usage demand throughout a solar day.

DESCRIPTION OF DRAWINGS

My invention is depicted by 26 sheets of drawings showing 30 figures, including:

FIGS. 1-6—Equivalent electrodynamic representations of my invention.

DESCRIPTION OF INVENTION

Figure 6:
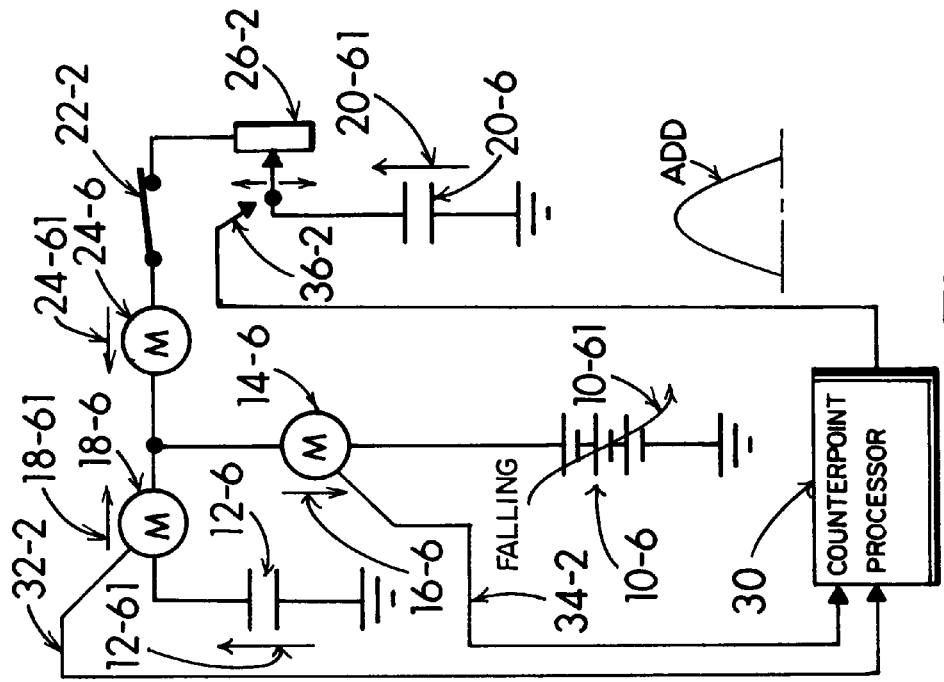

I have broken my invention's description down into several separate discussions and subsets of illustrative drawing figures to better express the novel intent and scope of the subject matter.

Electrodynamic Analogy

My invention may be comparatively over-viewed as an operational tidal energy based hydrodynamic system through an analogous use of electrical network symbology. A initial 90-degrees of a rising oceanic tide may be represented 10-1 in FIG. 1 by an increasing 10-11 source of DC power (or "variable battery") with current flowing forth 16-1 through a primary current-flow driven motor (or current meter) 14-1. The source 10-1, a meter 14-1 together with a current-driven motor 18-1 and a primary capacitor 12-1 forms a series circuit arrangement with the current flow 16-1 increasing 12-11 the charge stored in the primary capacitor 12-1. The result of the current flow 18-11 through the motor 18-1 induces the motor to deliver mechanical energy. In the context of my invention, later explained in explicit detail, the motors may be viewed as analogous to hydrodynamic turbines that drive generators (not shown). Hence as the increasing current 16-1 represented on the meter 14-1 flows until the battery 10-1 increase 10-11 representing an inflowing tide reaches a plateau or "slack tide" level. The increase of the battery potential is predicated as a leading 90-degrees of a full 360-degree cycle simulating a diurnal tidal cycle in waveform, if not in time. As a result of the switch (impeder) 22-1 being "open", no current flows through the secondary motor 24-1 to the secondary capacitor 20-1. An "open" switch in the electric circuit is analogous to a closed gate in a waterway: e.g., it stops the current flow.

When the maximum battery level nears about 72% of the maximum level, representing an onset of a second quarter cycle period (i.e., high slack tide) and a cessation of current flow through the motor 18-1, the switch 22-1 closes 22-2 in FIG. 2 to enable a substantial charging current to flow into the charge starved secondary capacitor 20-2. As the charge is allowed to accumulate 20-21 the necessitous current flow 24-21 excites operation of the secondary motor 24-2 as may be measured 16-2 on a meter 14-2.

Regulating current flow in either branch of this representative hookup, allows the charge-time 12-11, 20-21 for the capacitors 12-2, 20-2 to be managed to approximate the interval during which the increase 10-11 occurs both before and while the switch 22-2 is closed.

During the third quarter-cycle, the battery 10-3 level 10-31 falls as shown in FIG. 3 preferably with a decreasing sinusoidal level and upon reaching a predetermined level the secondary impeder 22-1 is opened, thereby retaining the maximal charge accumulated in the capacitor 20-3 and negating current flow 24-31 through the motor, while the capacitor 12-3 discharge 12-31 continues producing a current flow 18-31 exciting the primary motor 18-3 with the current 16-3 flow measured on the meter 14-3.

When the falling battery level approaches a predetermined minimum virtual slack-tide level, the switch 22-2 of FIG. 4 closes allowing the stored energy retained in the capacitor 20-4 to discharge 20-41 as a current flow 24-41 through the motor 244. As a result the motor 24-4 is excited during the period while the motor 18-4 current flow is null and the capacitor 12-4 is mostly discharged.

Figure 7:
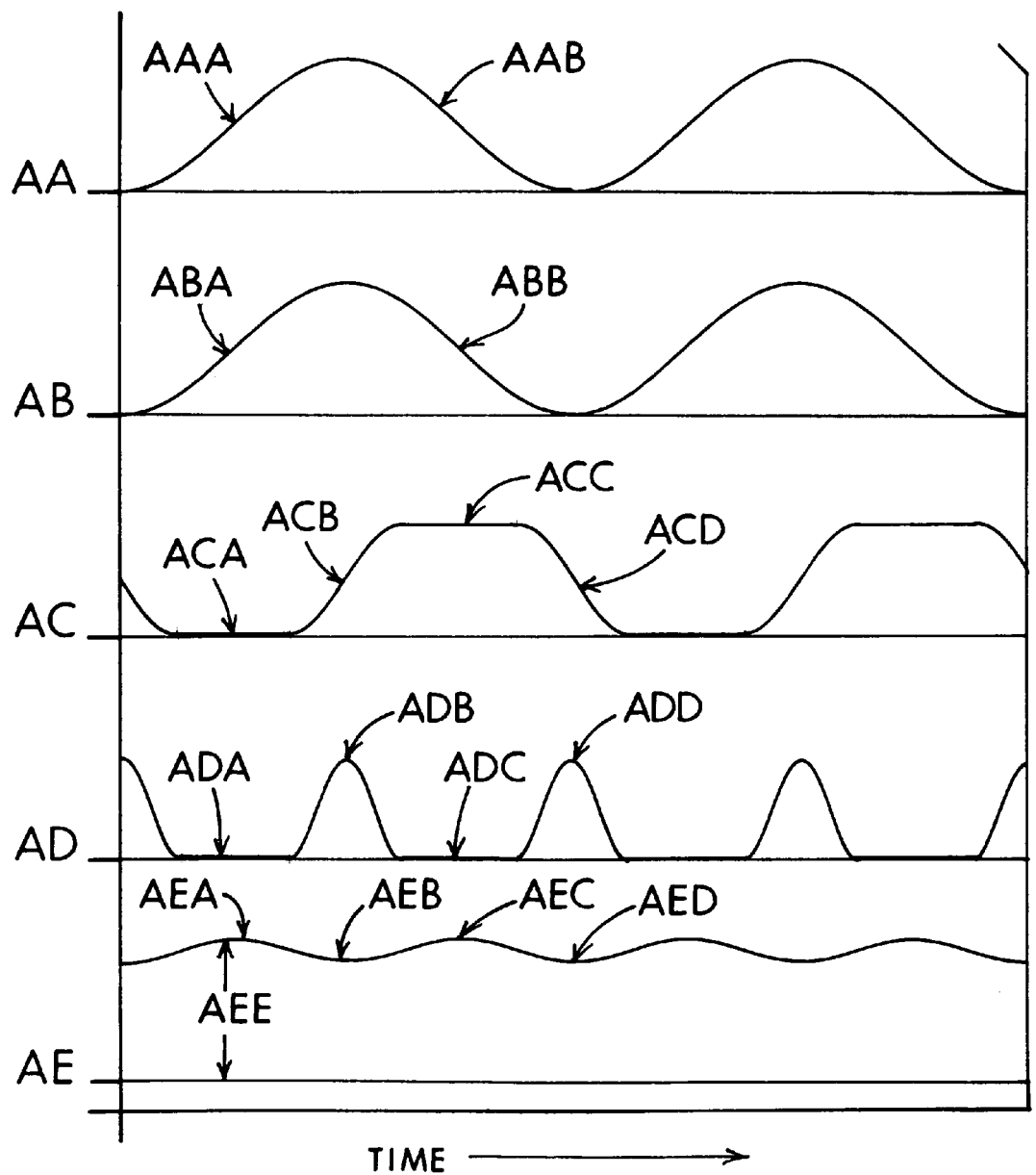
FIG. 7—Waveforms attendant with the presentations of FIGS. 1-6.

A rising and falling battery level AA is depicted in FIG. 7 and hereinafter described in association with FIG. 5 and FIG. 6.

Figure 5:
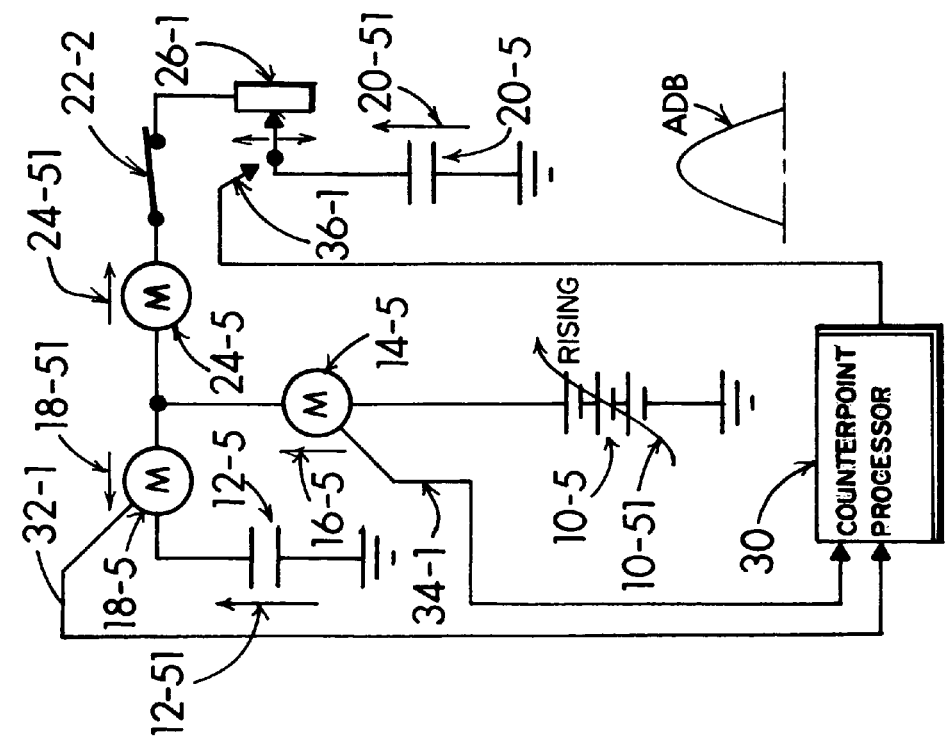

A nearly constant level of current flow 16-5 through the meter 14-5 of FIG. 5 is provided by allowing the rising 10-51 battery 105 level AAA to flow 18-51 through ABA the motor 18-5 on it's path to charging 12-51 the primary energy reservoir capacitor 16-5. During this initial (about first quarter-cycle) period the switch 22-2 is maintained OPEN, similar to the showing of FIG. 1. When the battery 10-5 rises to near a full level (approaching onset of the second quarter-cycle) the switch 22-2 closes and a flow 24-51 is established ACB from a lower level ACA to a higher level ACC through the secondary motor 24-5 as a charging 20-51 of a secondary energy reservoir capacitor 20-5 commences. FIG. 5 depicts a variable impeder (rheostat) 26-1 that may be controlled by a counterpoint processor 30 to sample 32-1, 34-1 the primary reservoir current flow and adjust the rheostat 26-1 in accord with a function ADB to modulate the charging current flow 24-51 through the motor 24-5 so the combined work-function (energy) delivered by the motors 18-5 and 24-5 is about constant AEA,AEB during the waxing half of the operational cycle.

Conversely a falling AAB battery 10-6 level 10-61 of FIG. 6 initially produces substantial current flow 18-61 through the motor 18-6 as the capacitor 12-6 charge ABB decreases 12-61. During this initial (about third quarter-cycle) period, the switch 22-2 is held OPEN, similar to the showing of FIG. 3 and the stored level ACC is maintained. Once the battery 10-6 level falls below a predetermined level approaching the fourth quarter-cycle, the switch 22-2 closes like in FIG. 4 and the energy reservoir capacitor 20-6 discharges ACD it's stored energy retained from the charge it received when practiced according to FIG. 5 leaching. Once again, the counterpoint processor 30 samples 32-2,34-2 the primary currents and determines a control signal 36-2 in accord with a function ADD to modulate the discharge 20-61 current flowing through the motor 24-6 so the combined work-function (energy) delivered by the motors 18-6 and 24-6 remains about constant AEC,AED during the waning half of the operational cycle.

Hydrodynamic Embodiment

Figure 8:
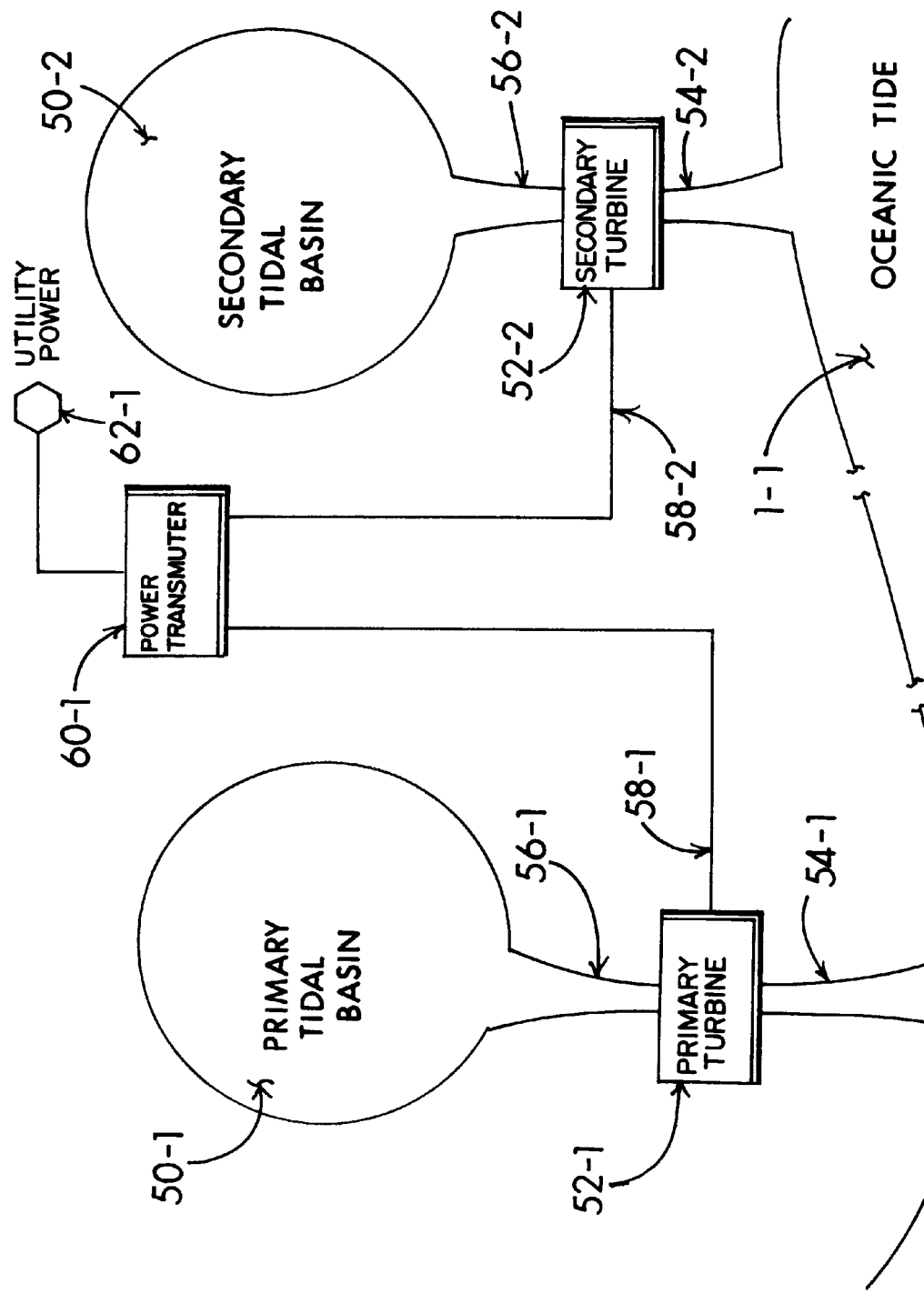
FIG. 8—Overview of a tidal facility showing two tidal basins having tideways connected with an oceanic tide source.

A tidal energy conversion system, practiced upon the principles taught by this invention, may be generally configured in accord with the showing of FIG. 8. Two separate tidal basins are utilized. These may be bodies of water enclosed by a barrage or dam, or else a natural estuary. In any event, the tidal basins are lake-like in character. A primary tidal basin 50-1 may have a bidirectional inlet 54-1,56-1 coupled through a primary turbine 52-1 with an oceanic tidal source 1-1. Additionally, a secondary tidal basin 50-2 is similarly coupled with the oceanic tide through the bidirectional inlet 54-2,56-2 as coupled through a secondary turbine 52-2. The turbines 52-1,52-2 may each include a generator (not shown) which delivers energy 58-1,58-2 to a power transmuter 60-1 which conditions the energy to deliver utility power 62-1 to a user base. This map-like depiction shows the generalized embodiment that my invention may embody to readily accommodate a civil engineering effort to fit the invention's teaching to local terrain or sea-coast conditions.

Presentment I

Figure 9:
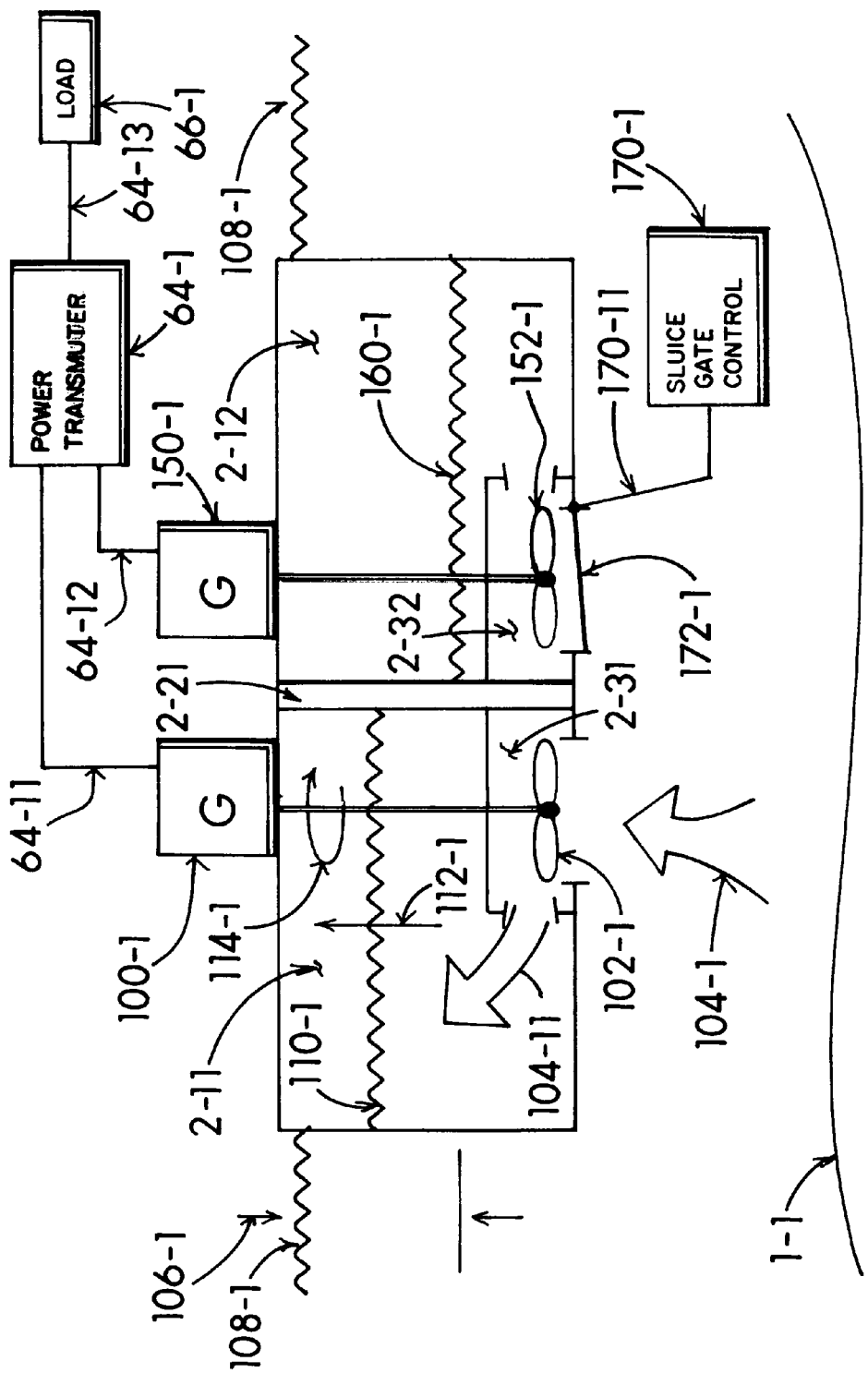
FIGS. 9-16—A sequence of operative schematics for my invention including a primary and secondary tidal basin configured to drive generators and deliver electric power.

An arrangement for my invention comprising two tidal basins 2-11,2-12 shows in FIG. 9 to include a source of oceanic tide 1-1 having risen 106-1 to a high-tide level 108-1. The result is an inrush 104-1 of tide-pressured water through a turbine 102-1 and into 104-11 a primary basin causing a rise 112-1 in the basin's water level 110-1 depicted BA in reference to FIG. 17. The turbine 102-1 is driven by this hydrodynamic action to convert into a mechanical rotation 114-1 of a shaft-member for driving a generator 100-1 delivering electric power 64-11 to a power transmuter 64-1. The transmuter adapts the generator output 64-13 into an usually constant-frequency alternating current power deliverable to a utile load 66-1. Observe that FIG. 9 also shows a secondary tidal basin 2-12 separated 2-21 from the primary tidal basin 2-11 and having an inlet presently protected against tidal water influx by a closed regulator gate 172-1 commanded closed 170-11 during the present interval by a sluice gate controller 170-1. As a result, the water level 160-1 is maintained near a low-tide level and the turbine 152-1 and generator 150-1 are quiet thereby delivering 64-12 no power to the transmuter 64-1.

Figure 10:
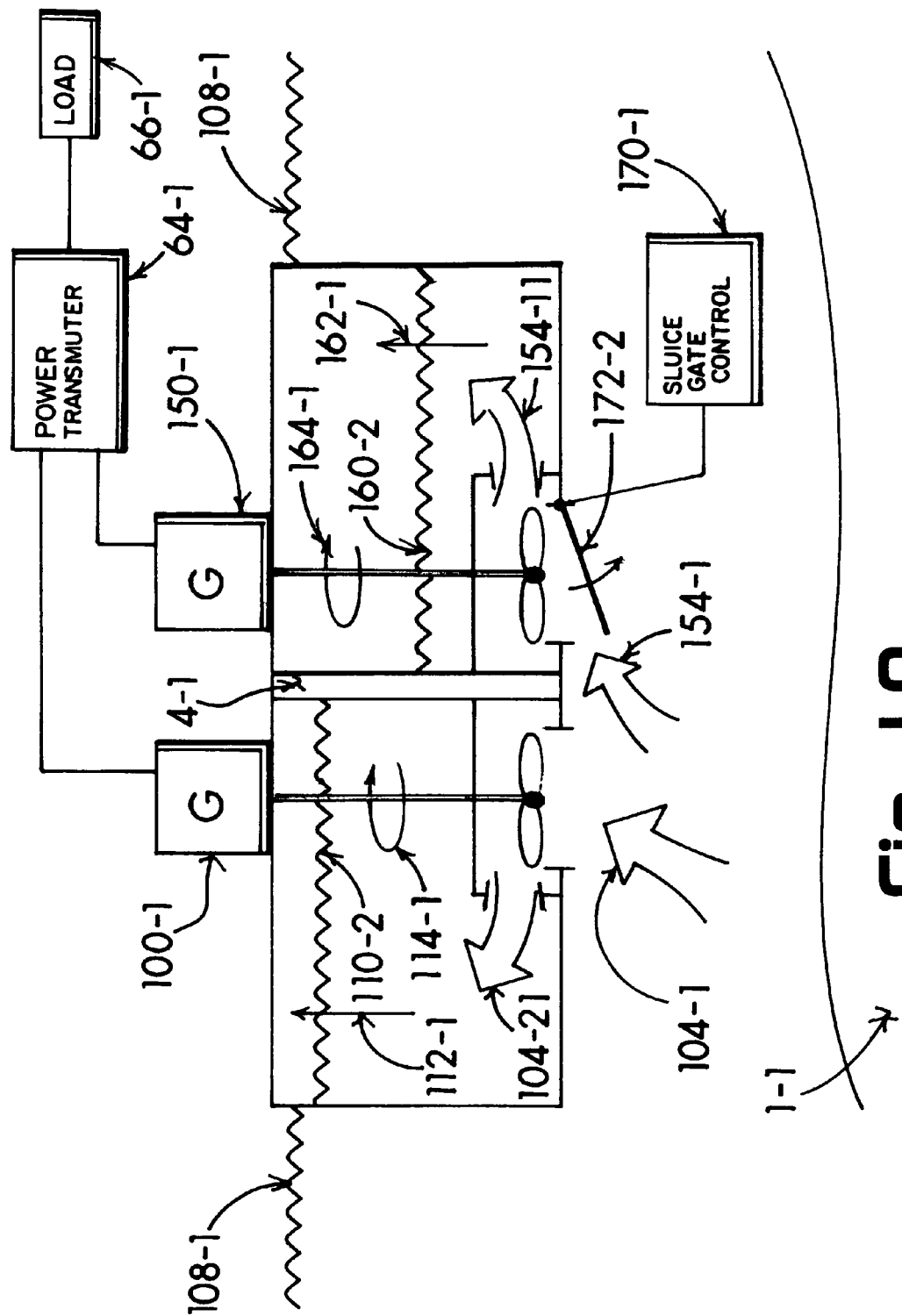
Figure 11:
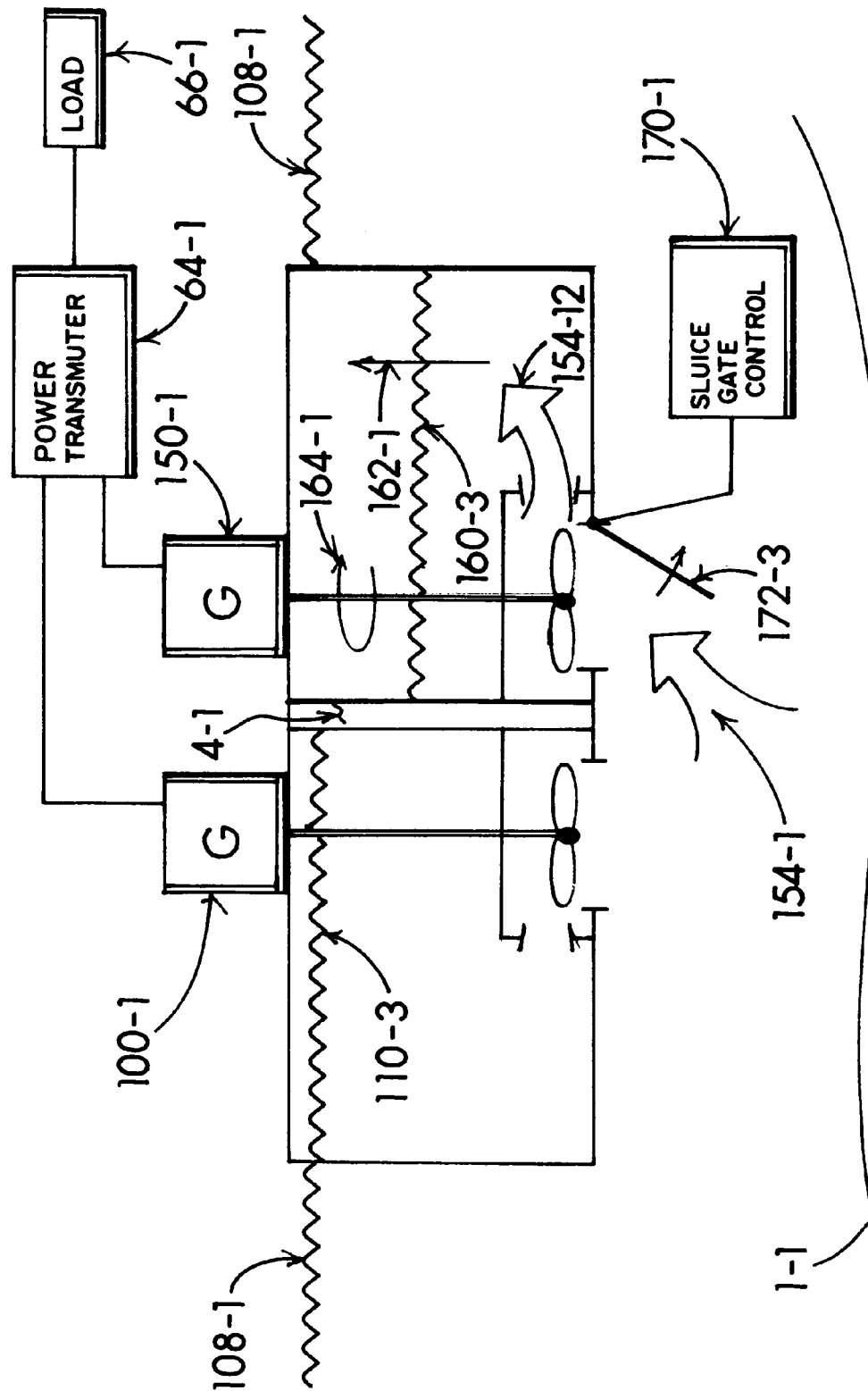

When the primary tidal basin's water level 110-2 nears the high tide level 108-1 BAA-BAB, the turbine excitation weakens due to a lessened inflowing of water 104-1,104-21. In a natural tidal setting, the fall-off of tidal forces operating on the turbine decay in a predictable more or less sinusoidal manner which according to FIG. 10 is in turn compensated for by a graduated opening of the secondary tidal basin's regulator gate 172-2 to allow an increasing inflow 154-1,154-11 of water through the secondary turbine 152-1 for delivering rotational force 164-1 to the secondary generator 150-1 as coupled with the transmuter 64-1. The secondary tidal basin water level 160-2 rises 162-1 in FIG. 17 as BBA-BBB towards the high tide level 108-1 as depicted in FIG. 11 to include a full-opening of the secondary regulator gate 172-3 when the primary basin water level 110-3 is most near the high tide level 108-1. Thus a maximum of energy is delivered to the secondary generator 150-1 by the turbine 152-1 while the primary generator 100-1 is. It is the teaching intent of the invention that this occurs during the high slack tide level period of the usual diurnal tide cycle.

Figure 12:
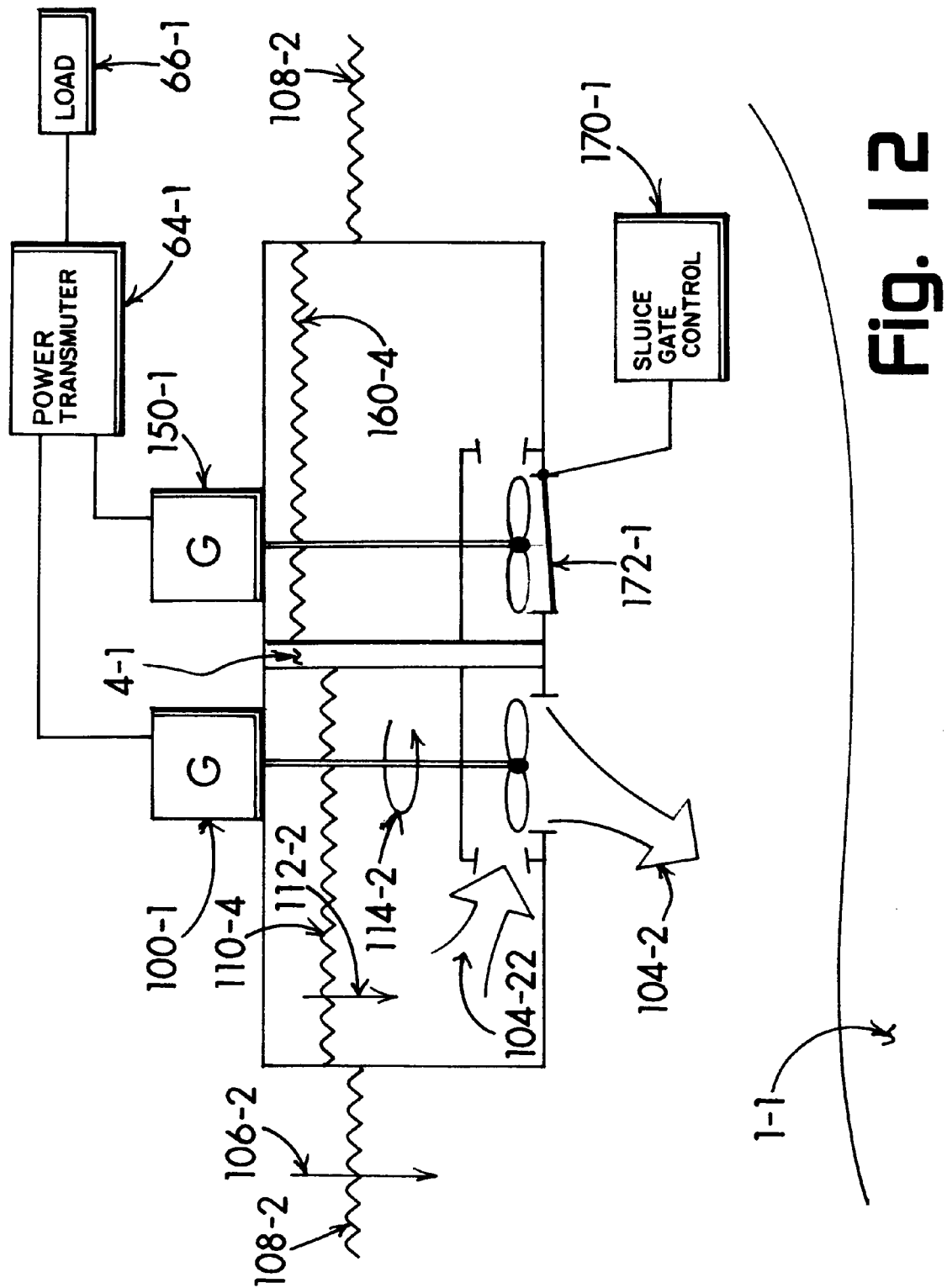
Figure 13:
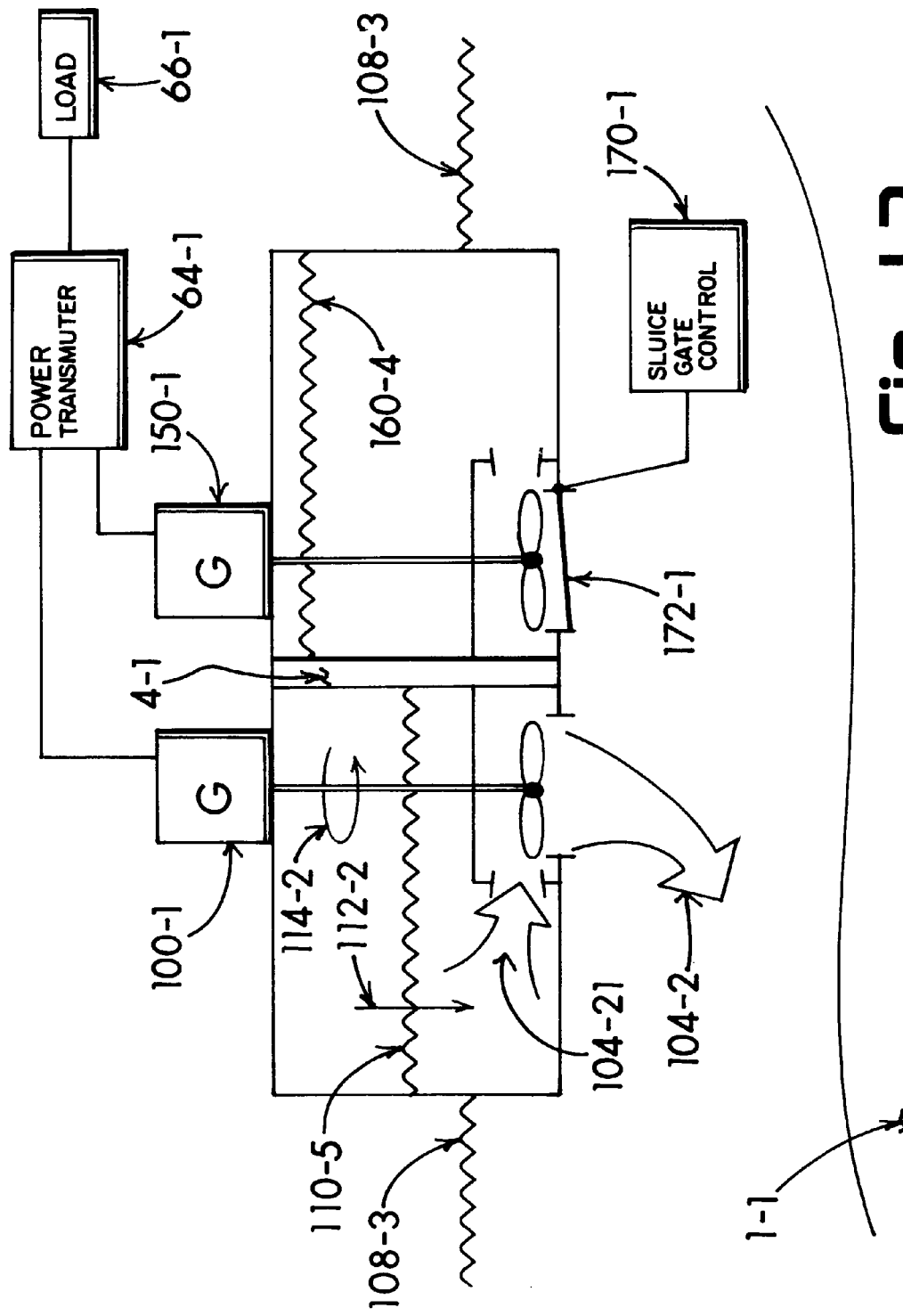
Figure 14:
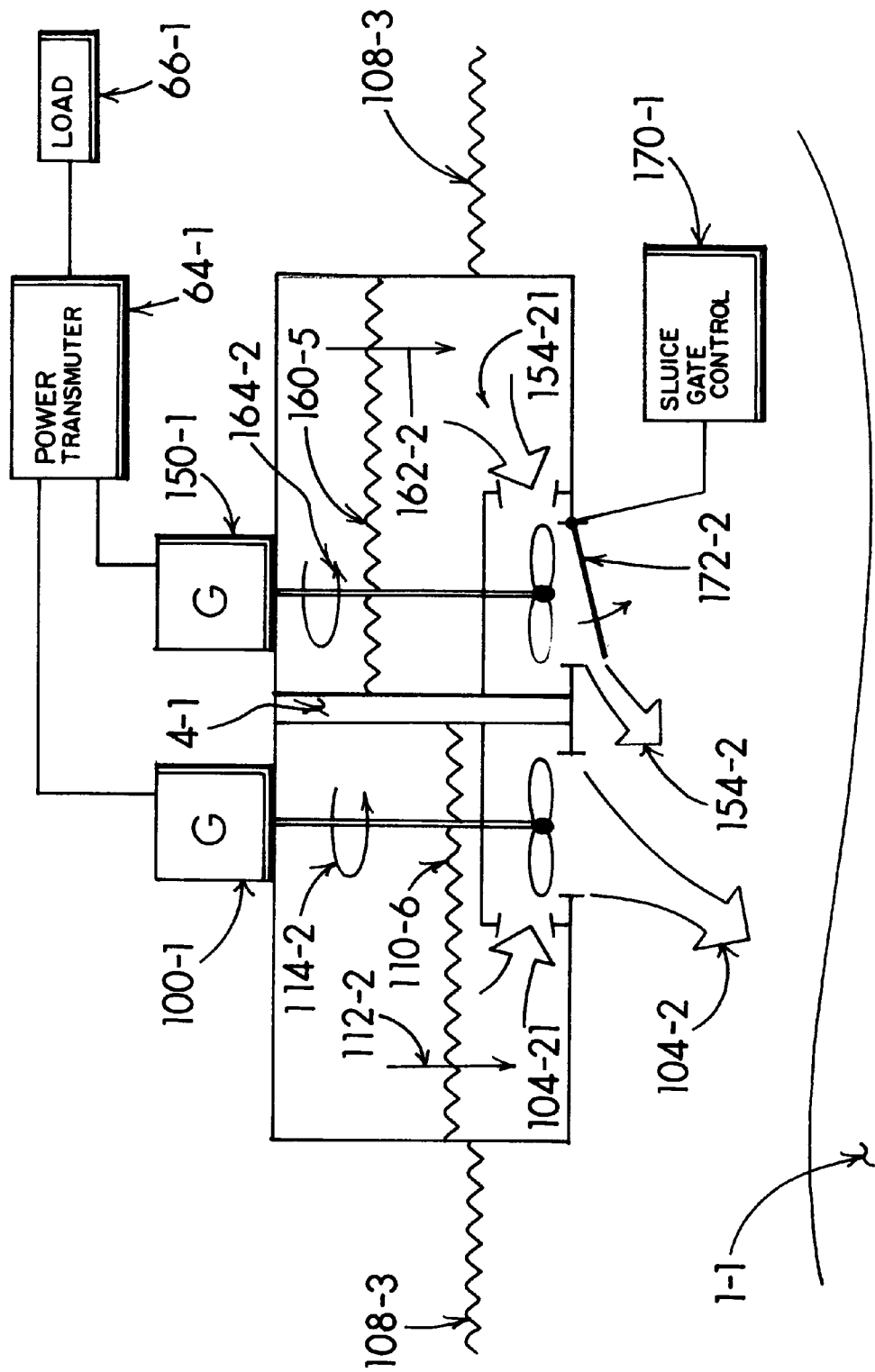

As the diurnal tide cycle advances, a falling 106-2 ebb tide 108-2 period BAB-BAC ensues whereupon the secondary regulator gate 172-1 may once again be controllably closed as shown in FIG. 12. The tidal ebb urges the water level retained in the primary tidal basin to rush through 104-2,104-22 the primary turbine 102-1 to energize and counter-rotate 114-2 the generator 100-1 shaft member thereby delivering electric power to the transmuter 64-1. Meanwhile, the secondary regulator gate 172-1 having been appropriately closed serves to store the water level 160-4 in the secondary basin at a relatively high level BBB-BBC. The tide level continues to ebb until it reaches a near-low ebb level 108-3 whereupon the low-tide slack period occurs. As FIG. 13 shows, the outflow of water held in the primary tide basin continues to outflow 104-21 and the primary turbine 102-1 continues to counter-rotate 114-2 albeit gradually weakening in force as the primary basin level 110-6 nears the ebb tide level 108-3. As this occurs, the sluice gate control 170-1 graduates the opening of the secondary regulator gate 172-2 allowing BBC-BBD an out-rush of water 154-2, 154-21 past the secondary turbine 152-1 causing it to excite counter-rotation 164-2 of the secondary generator 150-1 shaft member. As a result, an increasing level of electric power is delivered to the transmuter by the secondary generator 150-1 as the electric power output from the primary generator decreases.

Figure 15:
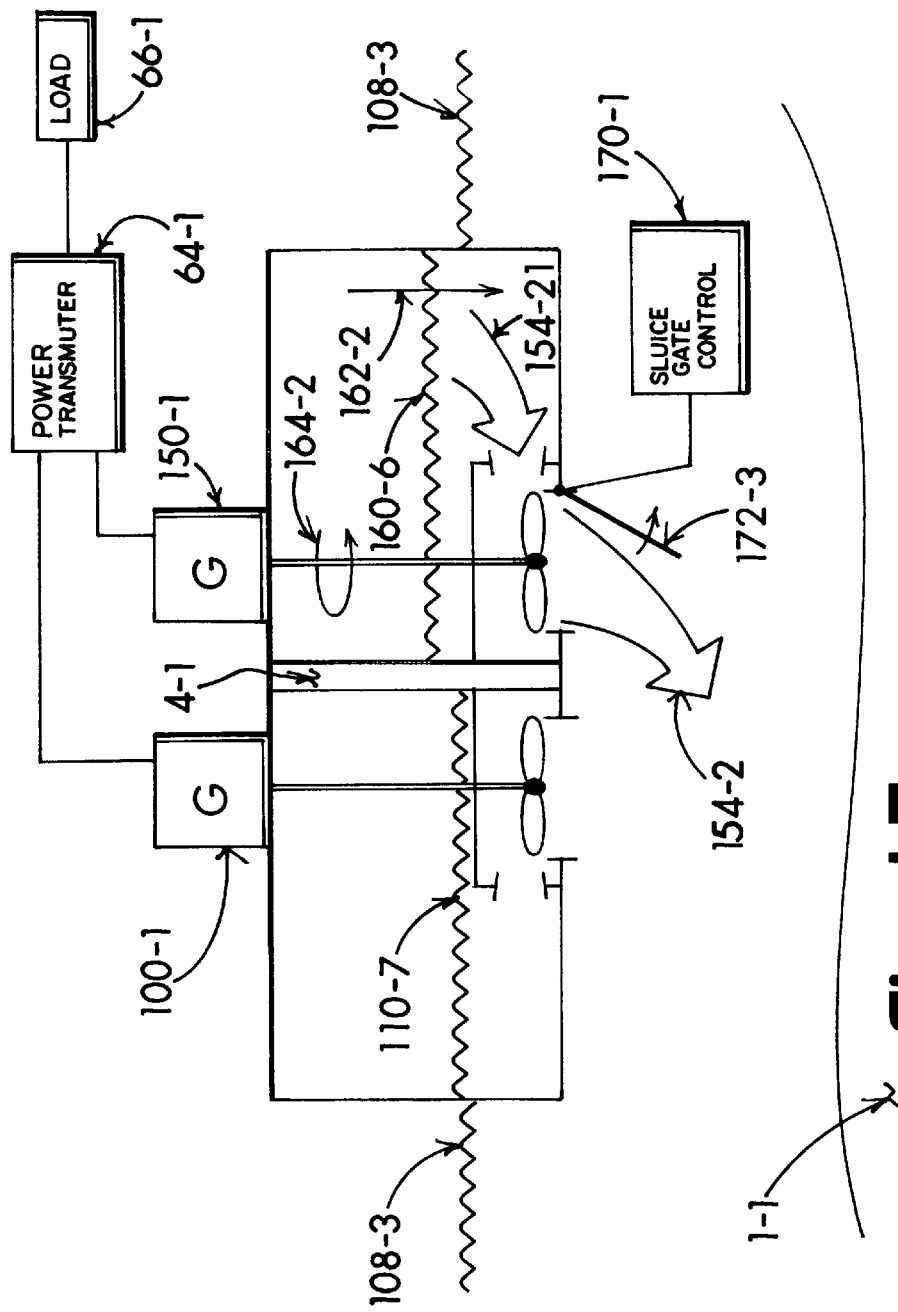
Figure 16:
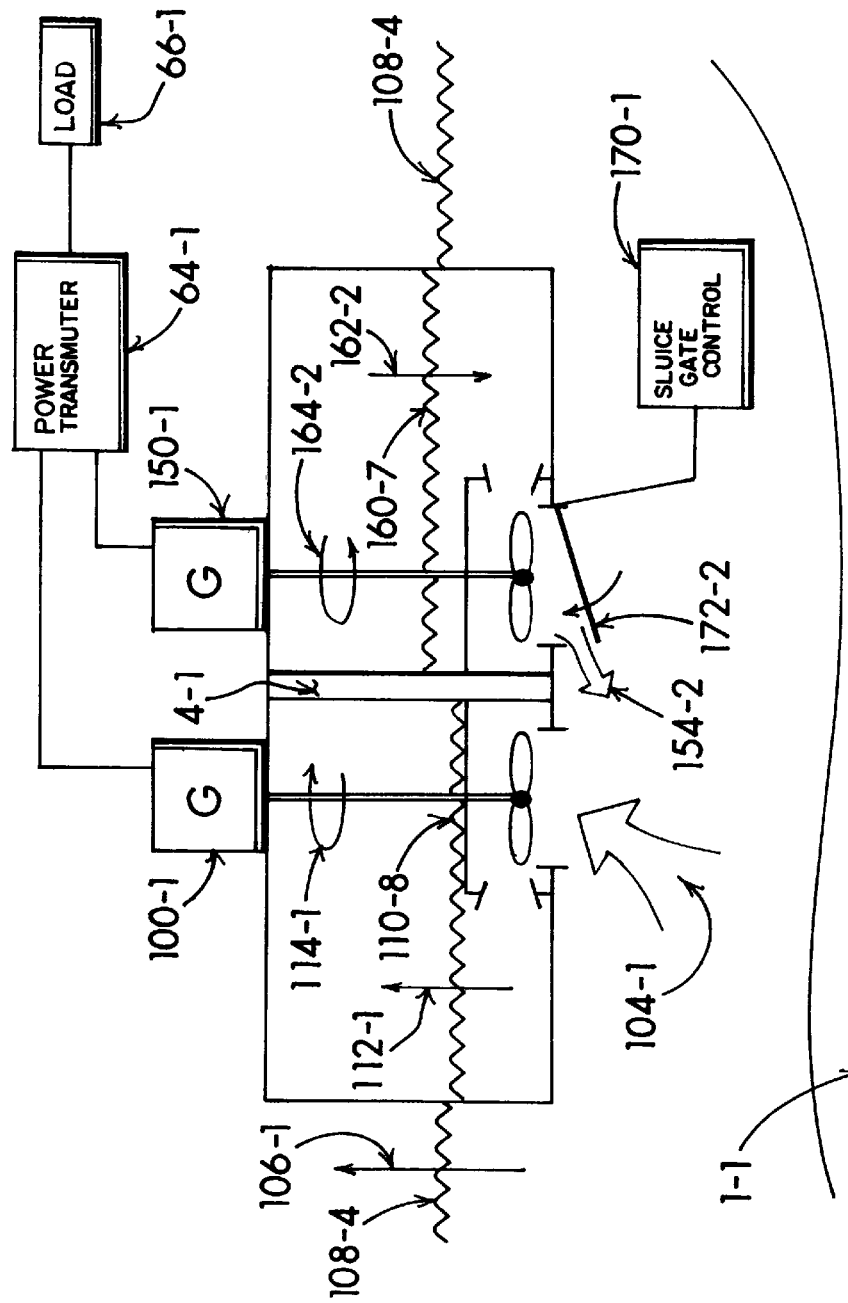

As the diurnal cycle advances towards the showing of FIG. 15, the water level 110-7 in the primary basin BAC-BAD nears that of the low slack tide level 108-3 and the turbine 102-1 quiets with the generator 100-1 output going to nil. By gauging the outflow 154-21 from the secondary basin excitation of the turbine 152-1 may be maintained until the tide once again rises 106-1 as FIG. 16 portrays. The ever-increasing tide level 108-4 brings forth an excitation of the primary turbine 102-1 by the inrush 104-1 of water to once again fill the primary tide basin and urge rotation 114-1 of the generator 100-1 driven shaft member. The sluice gate control 170-1 graduates the closure of the secondary regulator gate 172-2 as the primary flow 104-1 increases. This serves to retain the water level 160-7 of the secondary basin BBD-BBE near a low level, reserving the unfilled volume as a reserve of potential energy capacity usable during the next high slack tide interval.

Figure 17:
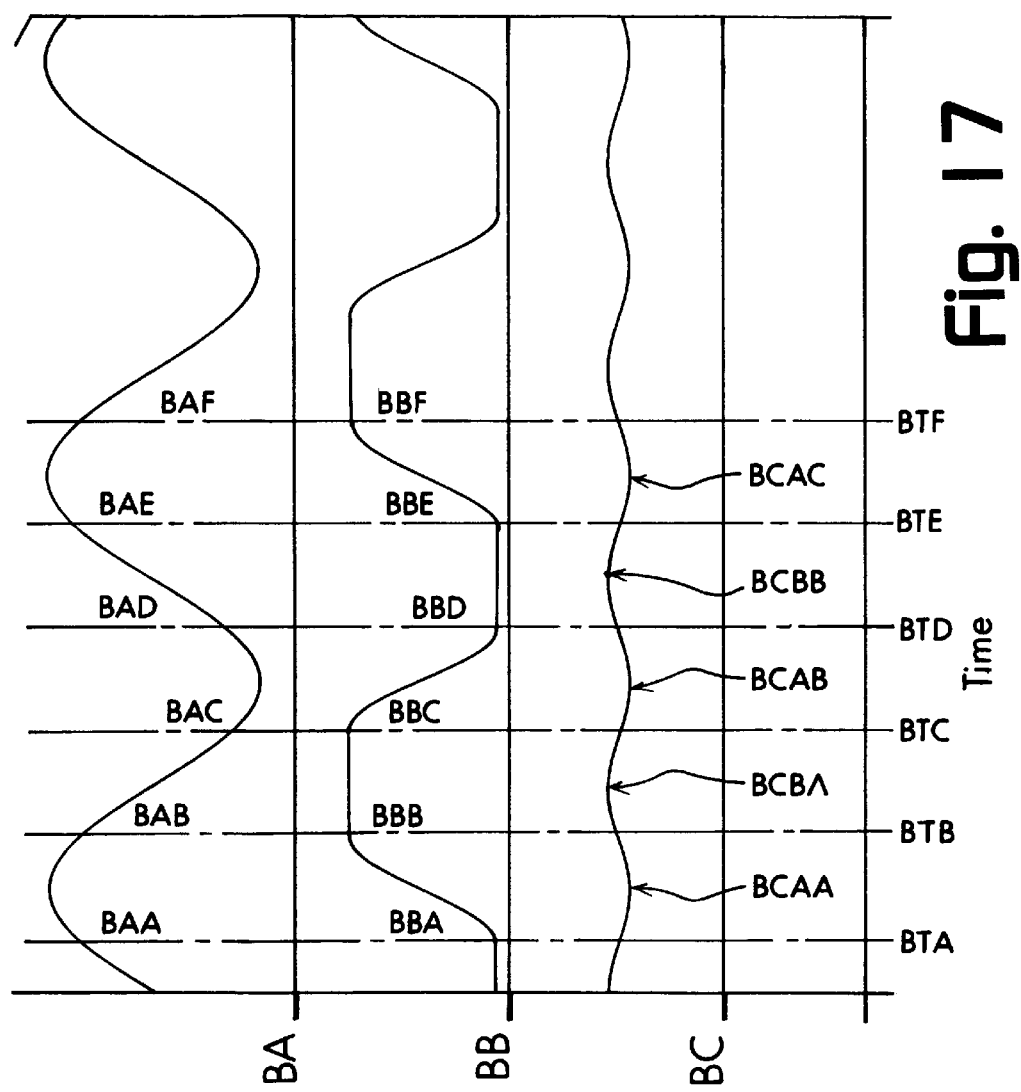
FIGS. 17-18—Waveforms attendant with the presentations of FIGS. 9-16.

By virtue of the graduated modulation of the inflow and outflow current through the secondary turbine 152-1 and its complement to the cyclic delivery of power by the primary turbine 102-1, the overall power delivery through the transmuter 64-1 remains relatively steady as shown in FIG. 17 plot BC. During periods of slack tide BAA-BBB and BAC-BAD for example, the output may moderately dip BCAA,BCAB while as the tide wanes and waxes BAB-BAC and BAD-BAE the increased flow through the primary turbine 102-1 may rise BCBA, BCBB. With considered engineering of the primary tidal basin and secondary tidal basin parameters of capacity and tide channel capacities the variation may be maintained in the +/−10% range throughout the diurnal cycle period.

Figure 18:
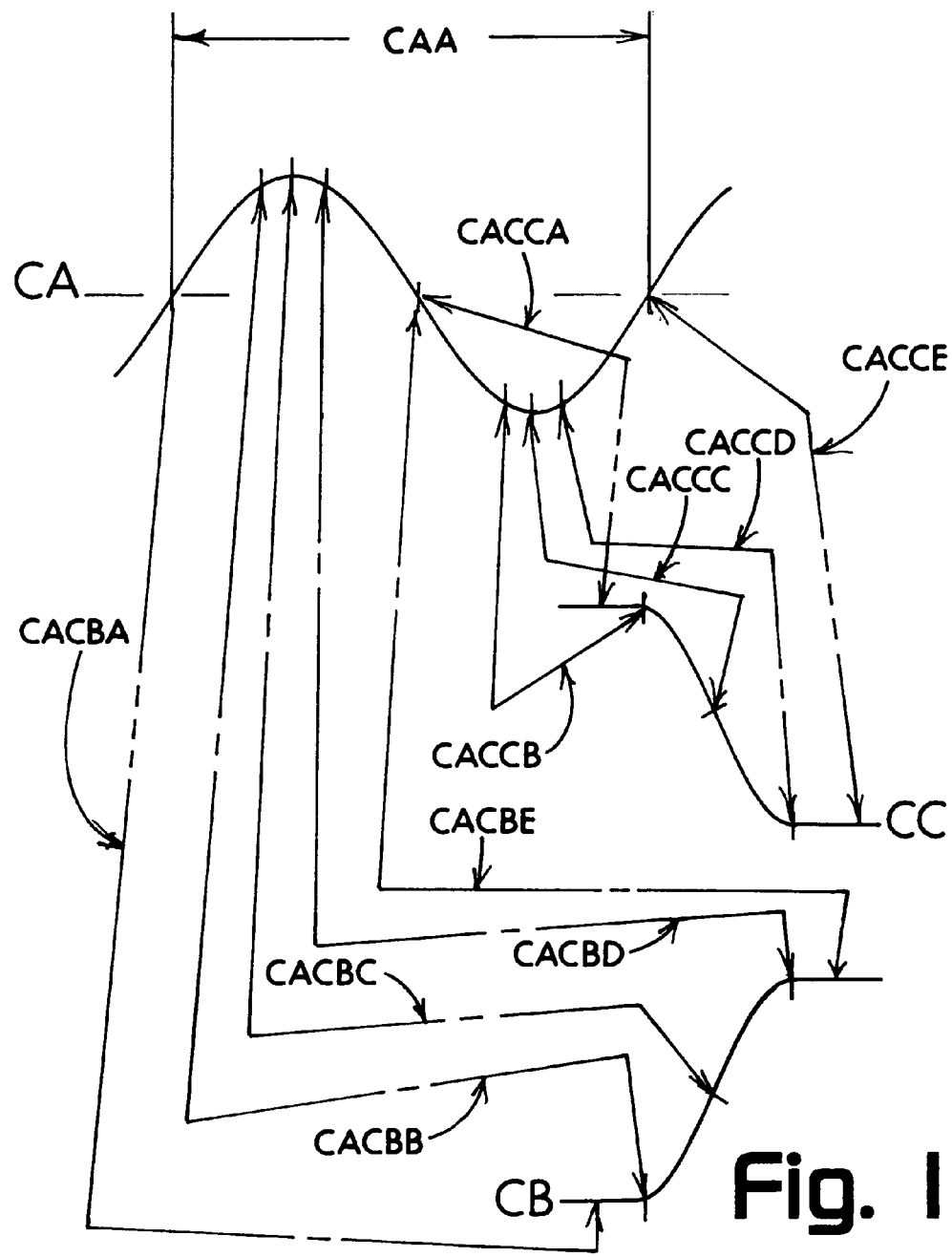

FIG. 18 particularly shows the interactional relationship between the diurnal tide cycle CA as it acts upon the primary tide basin and the invention's modulated inflow CB and outflow CC of the secondary tide basin 2-12. Plot CA begins at mid-flow of the tide cycle CAA when tide influx is maximal CACBA and the regulator gate 172-1 is closed, as shown on plot CB. As the tide CA rises towards crest, at about an 70-80% level the graduated opening of the regulator gate 172-1 initiates CACBB with an inflowing of water into the secondary tide basin and the resultant excitation of the turbine 152-1. As the high tide slack period elapses between intervals CACBB and CACBD the secondary tide basin is allowed to continue, albeit modulated by the sluice gate controller 170-1. Obviously in accord with plot CB, the inflow gradually increases, rises to a maximum level CACBC and then gradually decreases CACBD when the ebbing of the primal tide energy CA strengthens. As a result, the regulator gate 172-1 is again closed during the interval CACBD-CACCD which maintains the secondary tidal basin stored-up energy potential at a maximum. When the primary tidal basin outflow approaches the low-tide slack period CACCB-CACCD, the regulator gate 172-1 is graduated open by the sluice regulator gate controller 170-1 to allow a discharge of the held-back water energy in the secondary tidal basin 2-12 through the secondary turbine 152-1. When the low-tide slack mid-point CACCC is reached, the outflowing from the secondary tidal basin is ordinarily about maximum as commanded by the sluice regulator gate controller 170-1. When the diurnal cycle begins to repeat, the up-rising of the tide finds a point CACCD where the regulator gate 172-1 may again be programmatically closed, thereby maintaining the low water level in the secondary tidal basin as a reserve source of tidal energy during the next high-tide slack period.

Presentment II

Figure 19:
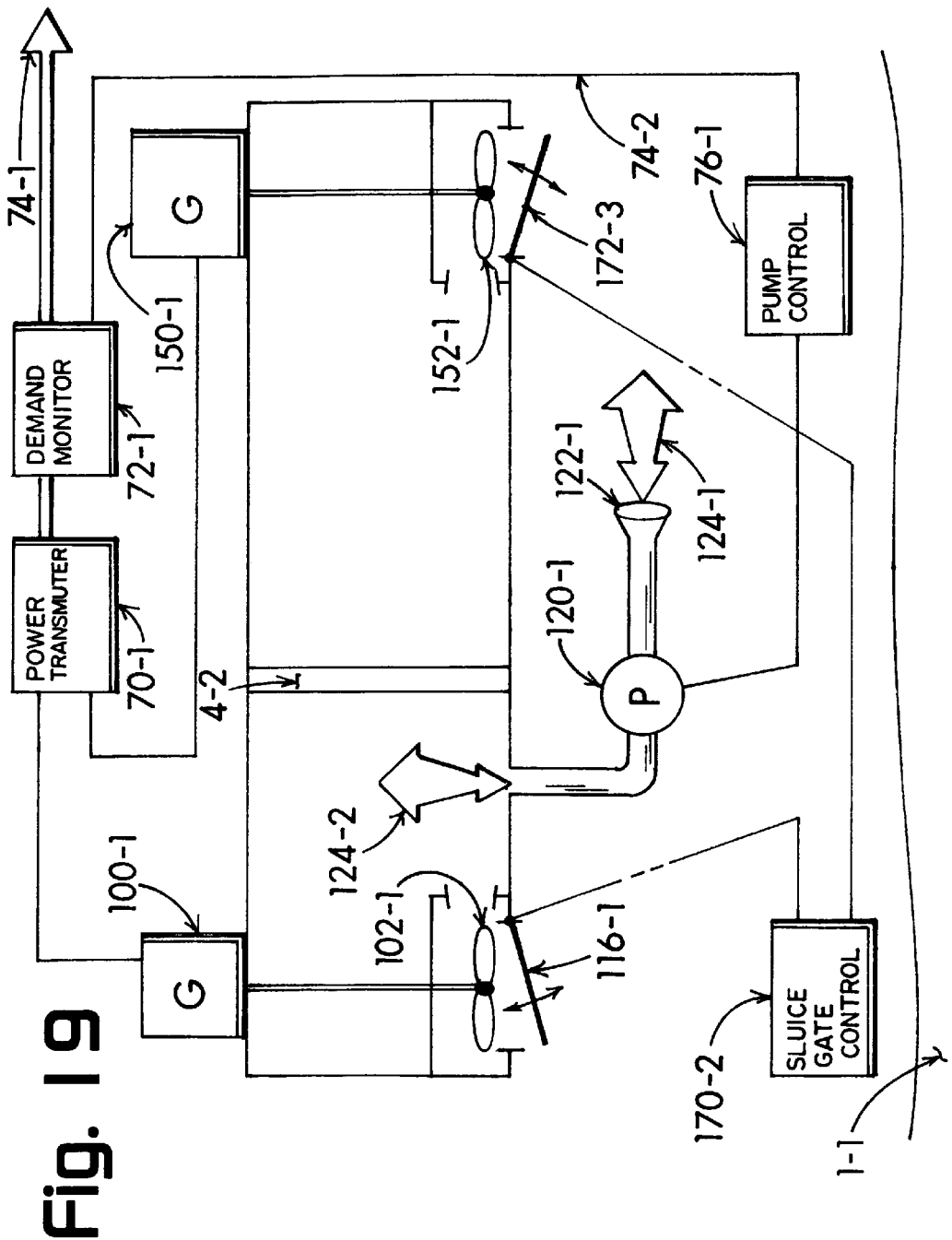
FIG. 19—Introduction of an ancillary pump to boost cyclic performance.

One of the factors which confound known tidal energy sources is the lack of time synchronization between tide energy availability and customer usage demand. This occurs in part because of the difference between the duration of a solar day and a diurnal (tide) day. As a result, demand may regularly peak when the tidal energy based system is least able to provide. I intend with FIG. 19 to depict how excess energy during intervals of lessened demand may be effectively stored-up to effectively meet future anticipated demands. I achieve this by introducing a pump 120-1 having an inlet/outlet 122-1 capable of bidirectional water management that may either draw water into or exhaust water from 124-2 primary tidal basin 2-11, including the primary turbine 102-1 now controlled by a regulator gate 116-1 commanded by a sluice gate controller 170-2 that determines the power needs of a directed load 74-1. During the interval of rising tide, the turbine 102-1 is utilized to service the load 74-1. During the period of high slack tide, the turbine 152-1 may service the load and preferably during the high slack tide period most of the energy potential of the secondary tidal basin is spent. To accomplish this in event of a low demand or off-peak period of demand, the pump 120-1 is operated by a pump controller 76-1 coupled 74-2 with the demand monitor 72-1 to push the level in the primary tidal basin "above normal". Then this extra energy becomes available when an increased demand occurs during the next ebb tide interval.

Conversely, when the energy available from the secondary tidal basin resources exceed demand during a period of low slack tide, the pump 120-1 may be utilize some of the excess energy to draw the primary tidal basin level down, below a level which it attains by tidal gravitational forces alone. This allows the increase of energy capability for the primary tidal basin during a subsequent period of increased demand.

Presentment III

Figure 20:
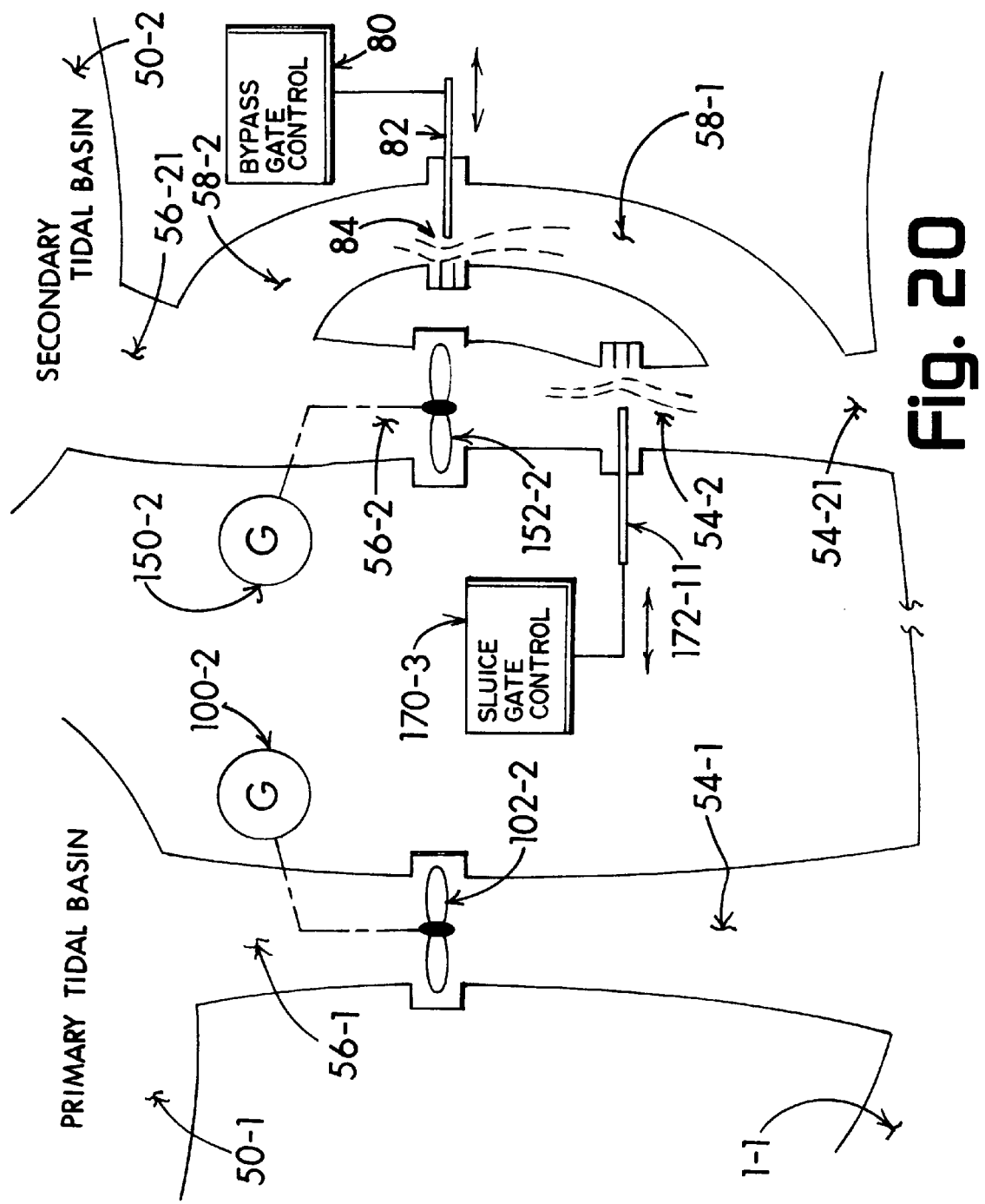
FIG. 20—Overview of the tidal facility of FIG. 8 to include supplemental bypass of the secondary tidal basin to accommodate wider swings in energy demand.

A further consideration of less-than-expected load demand may be a back-up of unused tide water inflow or outflow, particularly from the secondary tidal basin. FIG. 20 shows a situation including the elements of earlier FIG. 8 to have the secondary tidal basin 50-2 fitted with a primary tideway 54-2, 56-2 including a turbine 152-2 and a regulator gate 172-11 and controller 170-3 depicted to operate as previously taught relative with FIGS. 9-18. This showing differs through the inclusion of a bypass tideway 58-1,58-2 including a bypass control regulator gate 82 that regulates the flow 84 through the bypass tideway commanded by a bypass gate controller 80. The intent is to show that during periods of decreased load demand and while the secondary tidal basin outflows through the turbine 152-2, the near-full discharge of the reserve energy capacity of the secondary tidal basin may be accomplished by enabling a portion of the outflow to bypass the turbine through the bypass tideway 58-1,58-2. Conversely, when tidal influx occurs from a high slack tide level 1-1 into the potential containment capacity of the lowered-level secondary tidal basin 50-2, additional water may be allowed through the bypass tideway to achieve a high as possible water level resulting in a maximum of reserve energy capacity during the next period of slack low tide energy demand.

Presentment IV

Figure 21:
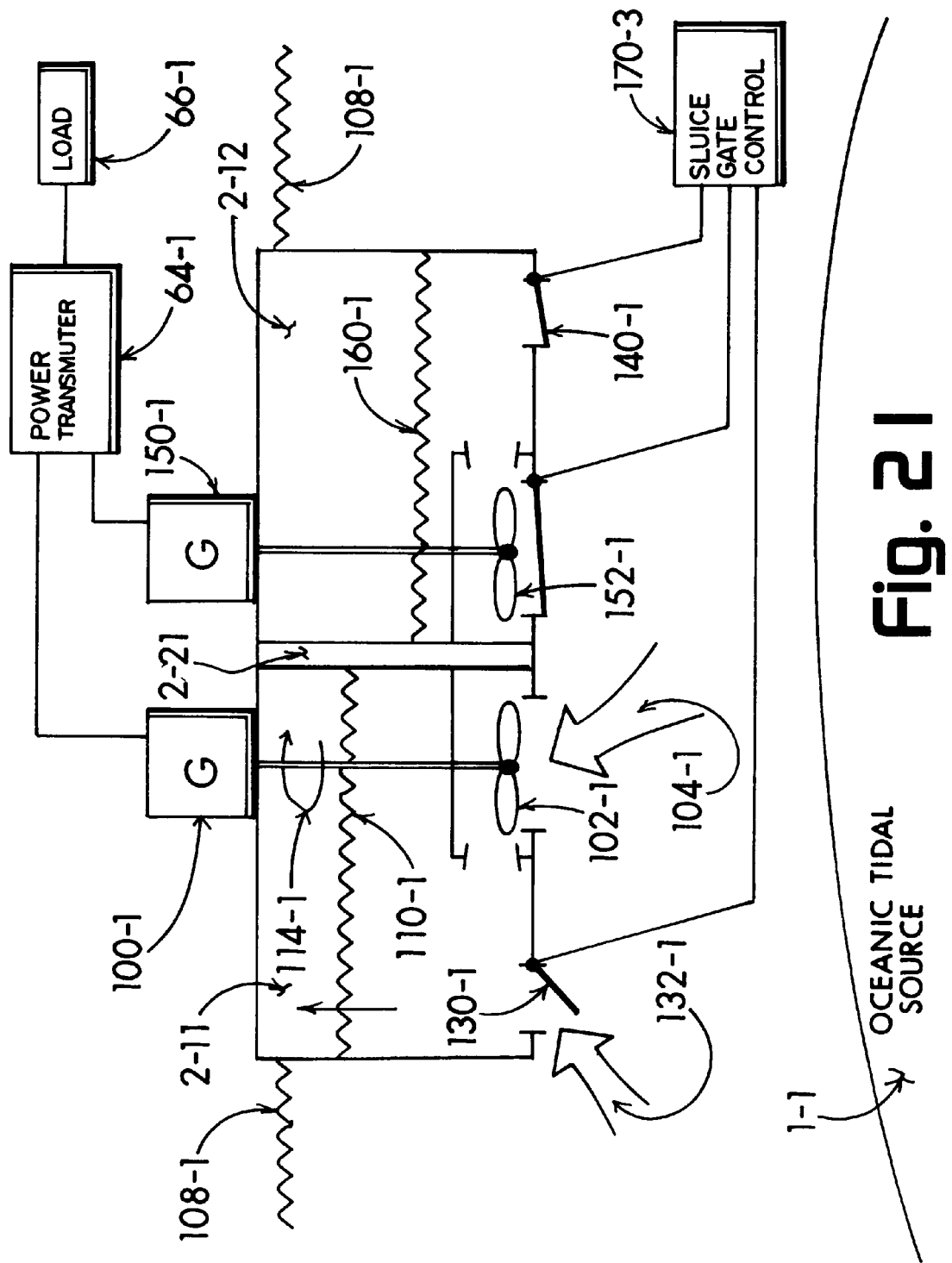
FIGS. 21-22—Operative schematics related with FIGS. 9-16 to include provision for supplemental bypass of the turbines.

My teaching of FIG. 21 particularly shows the control of the primary tidal basin 2-11 capacity. This depiction most closely associates with earlier FIG. 9 teachings with the main exception being an inclusion of an additional regulator gates 130-1 and 140-1 that may operate in concert with regulator gate 172-1 to modulate the overall performance of the tidal energy system to best match-up with load demand variations. The performance as shown includes an increasing primary tidal basin level 110-1 driving the primary turbine 102-1. In even the level 110-1 trails to Increase "fast enough" due to decreased load 66-1 demand, additional inflow 132-1 is shunted into the primary tidal basin by a graduated opening of a primary bypass regulator gate 130-1 commanded by a sluice gate control 170-3.1 find that the generalized decision regarding the regulator gate 130-2 operation may be determined by factoring load demand and immediate primary basin water levels relative with a measure of elapsing diurnal time concurrent with the period of high-tide slack water.

Figure 22:
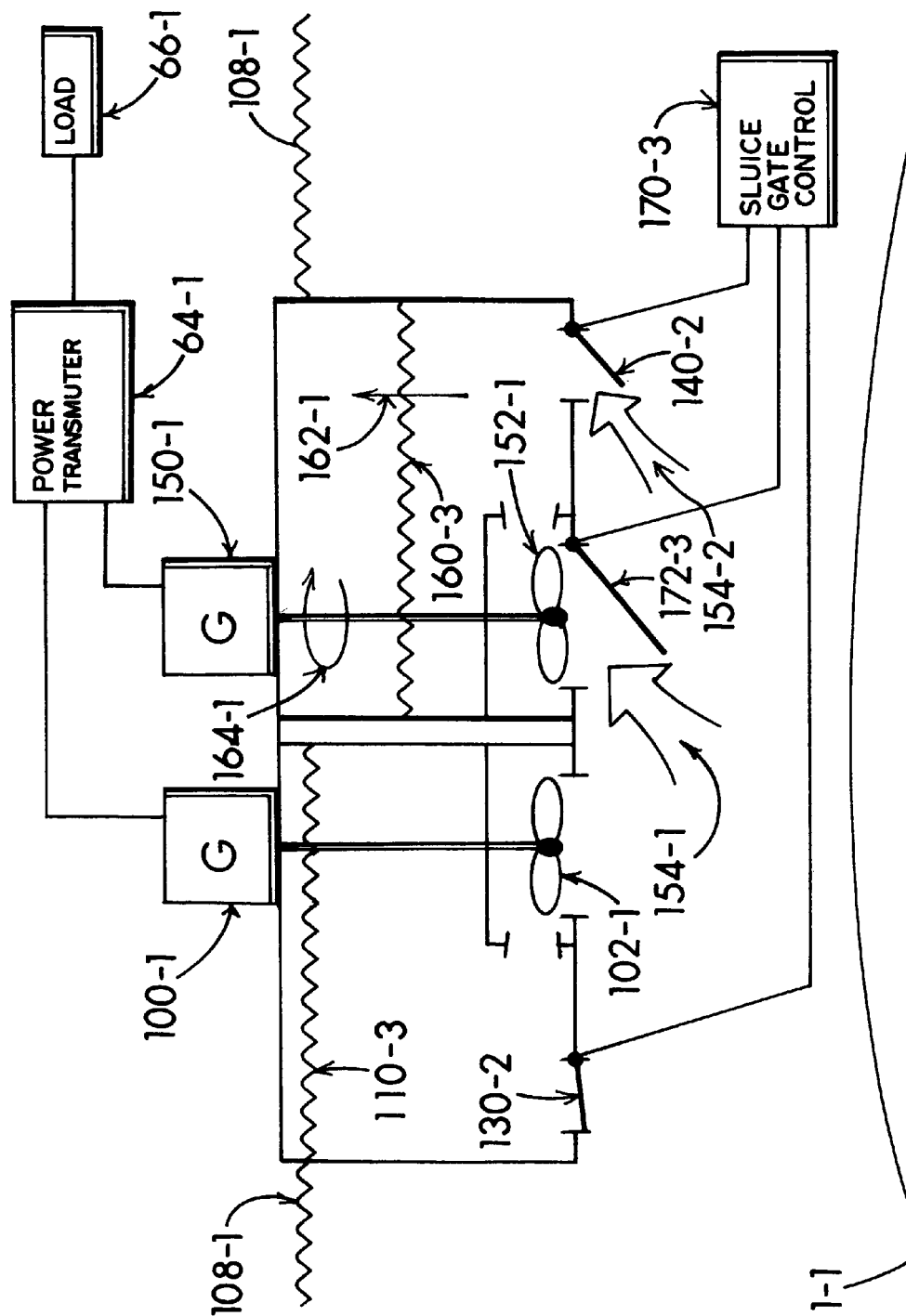

My further teaching of FIG. 22 shows the control of the secondary tidal basin 2-21 capacity. This depiction most closely associates with earlier FIG. 11 teachings with the main exception being an inclusion of the additional regulator gate 140-2, operative in concert with the sluice regulator gate 172-3 to best match-up the reserve capacity of the secondary tidal basin with immediate and anticipated load 66-1 demands. As shown, the secondary tidal basin inflow current drives the secondary turbine 152-1 and raises 162-1 the water level 160-3. In event the water level increase is lagging, relative with the duration of the attendant high-tide slack period that might be wrought by the decreased load 66-1 demand, an additional inflow 154-2 of water is shunted into the secondary tidal basin by the graduated opening of a secondary bypass regulator gate 140-2 commanded by the sluice gate control 170-3. Once again, I find that the generalized decision regarding the regulator gate 140-2 operation is best determined by factoring load demand and immediate secondary tidal basin water level relative with a measure of elapsing diurnal time concurrent with the period of low-tide slack water.

Presentment IV

I find a further enhancement in performance utilizing more than one supplemental tidal basin in addition to the primary tidal basin. I schematically depict this embodiment in FIG. 23 to include the primary tidal basin 2-11, the secondary tidal basin 2-121 and an additional tertiary tidal basin 2-122. The secondary and tertiary tidal basins are both fit with regulator gated turbines 152-31,152-32 coupled with generators 150-11,150-12 to deliver power to a power transmuter 64-2 coupled with the load 66-1. Each of the turbines 152-31,152-32 include a regulator gate provision 180-2,182-1 commanded by a sluice gate controller 170-2.

Figure 23:
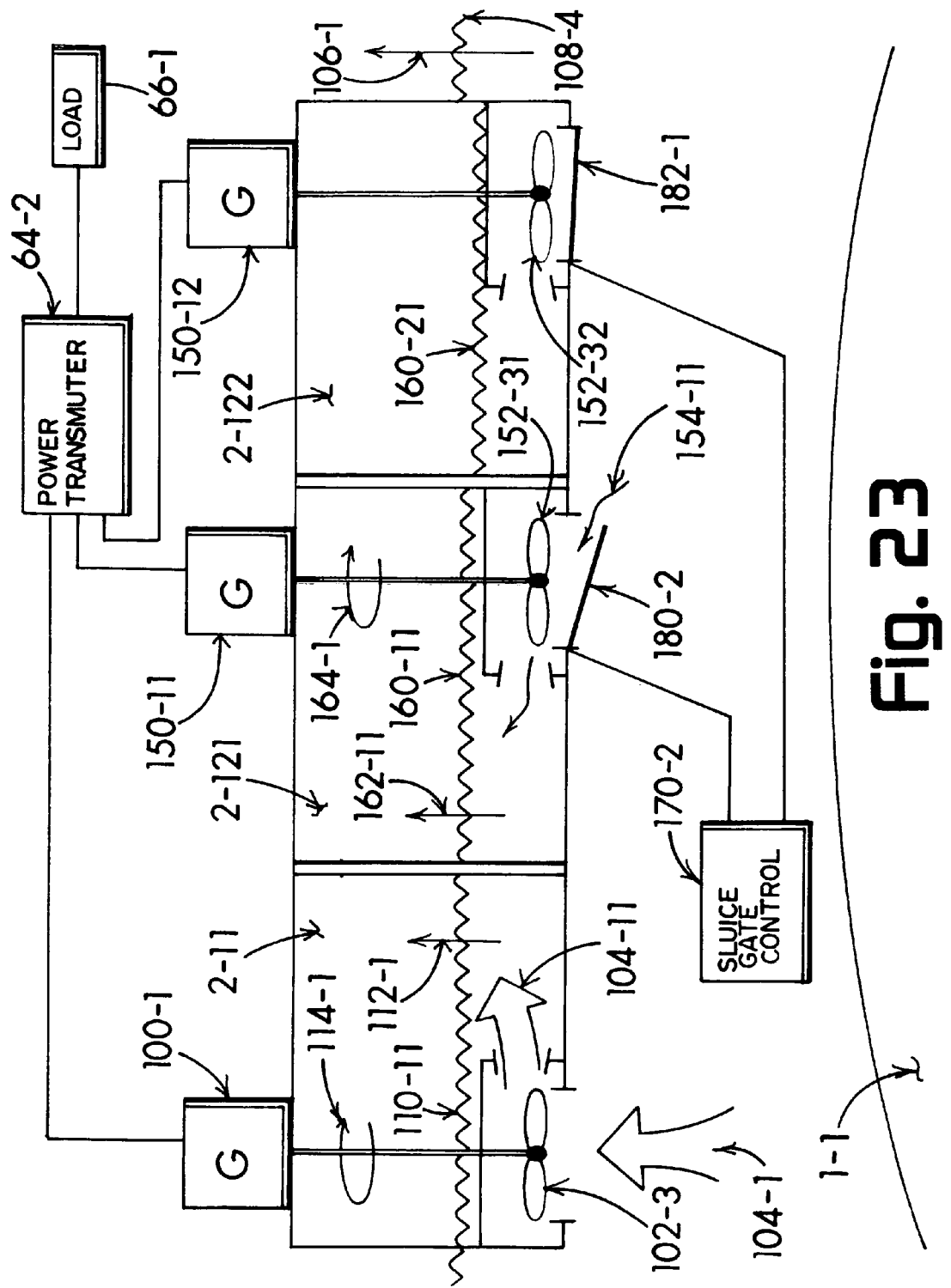
FIGS. 23-29—A sequence of depictions showing a primary, secondary and tertiary tidal basins intending to support a more uniform delivery of electric energy to the load.
Figure 24:
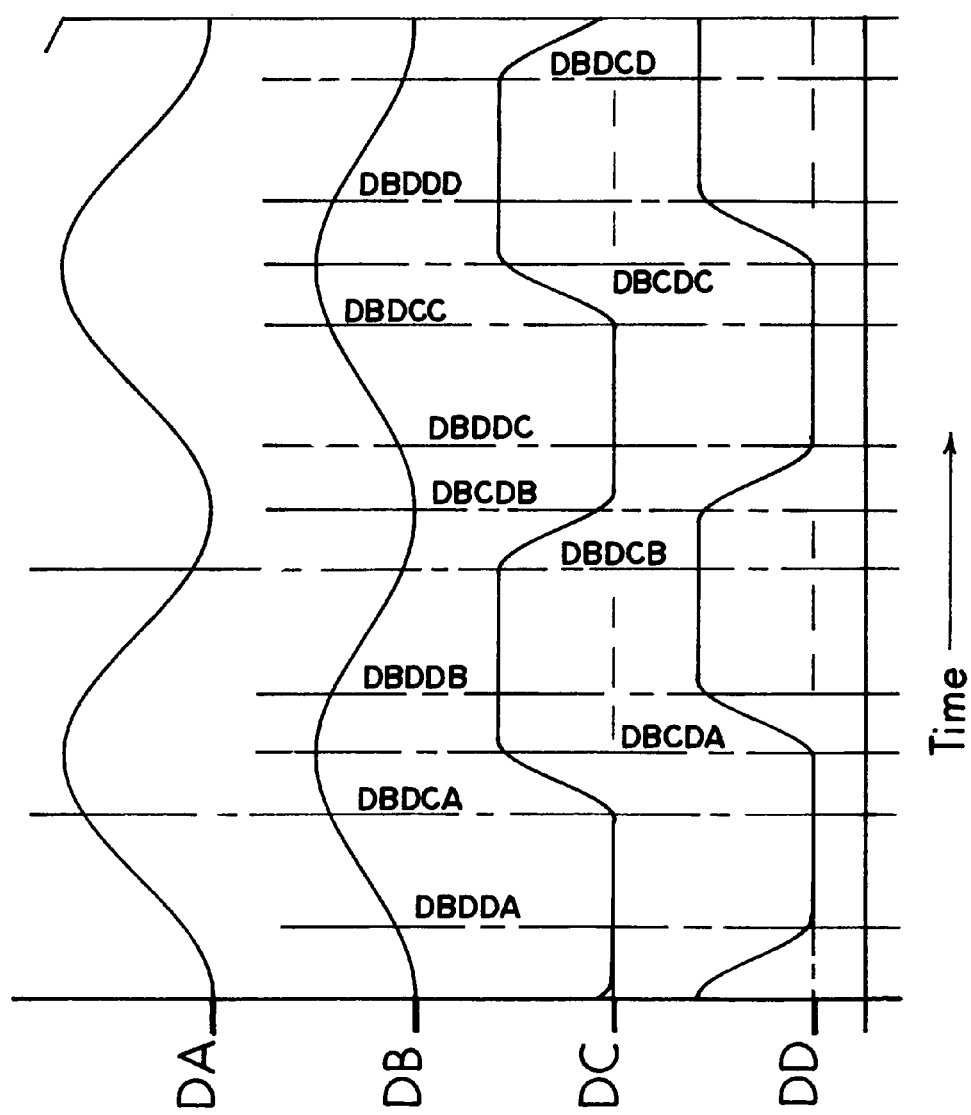

As FIG. 23 shows, the low tide 1084 is rising 106-1 with the oceanic source 1-1 tidewater DA of FIG. 24 rushing in 104-1 to drive a primary turbine 102-3 by turning 114-1 the generator 100-1 main-shaft. The inflowing water 104-11 increases 112-1 the water level DB in the primary tidal basin near the same rate as the tide DAAA is rising 106-1. As this occurs, the secondary regulator gate 180-2 is being closed and the inflow 154-11 diminished, thereby maintaining the secondary tidal basin level 160-11 near minimum DCAA,DCAB and with the turbine 152-31 rotational excitation 164-1 of the generator 150-11 about to cease. It is the intent of allowing this minor inflow into the secondary tidal basin to maintain some additional power delivery from the secondary generator 150-11 during the early stage of the sinusoidal-like increase DBAA in tidal current inflow. The tertiary regulator gate 182-1 is purposefully closed at a low portion DDAA of a precedent diurnal cycle (near the low-tide slack time), hence to retain a maximum of reserve capacity when the secondary tidal basin nears capacity DBCDA.

Figure 25:
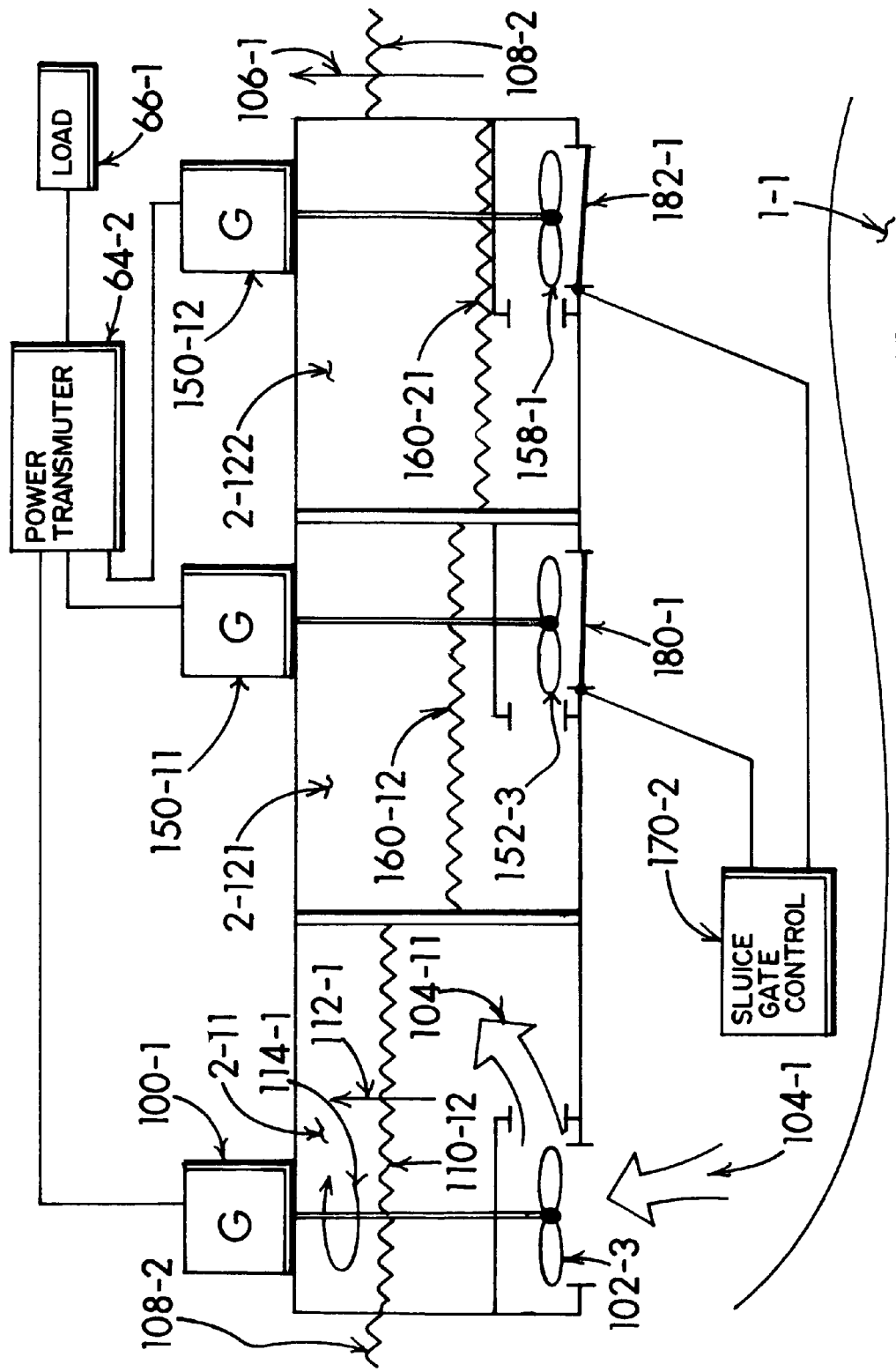
Figure 26:
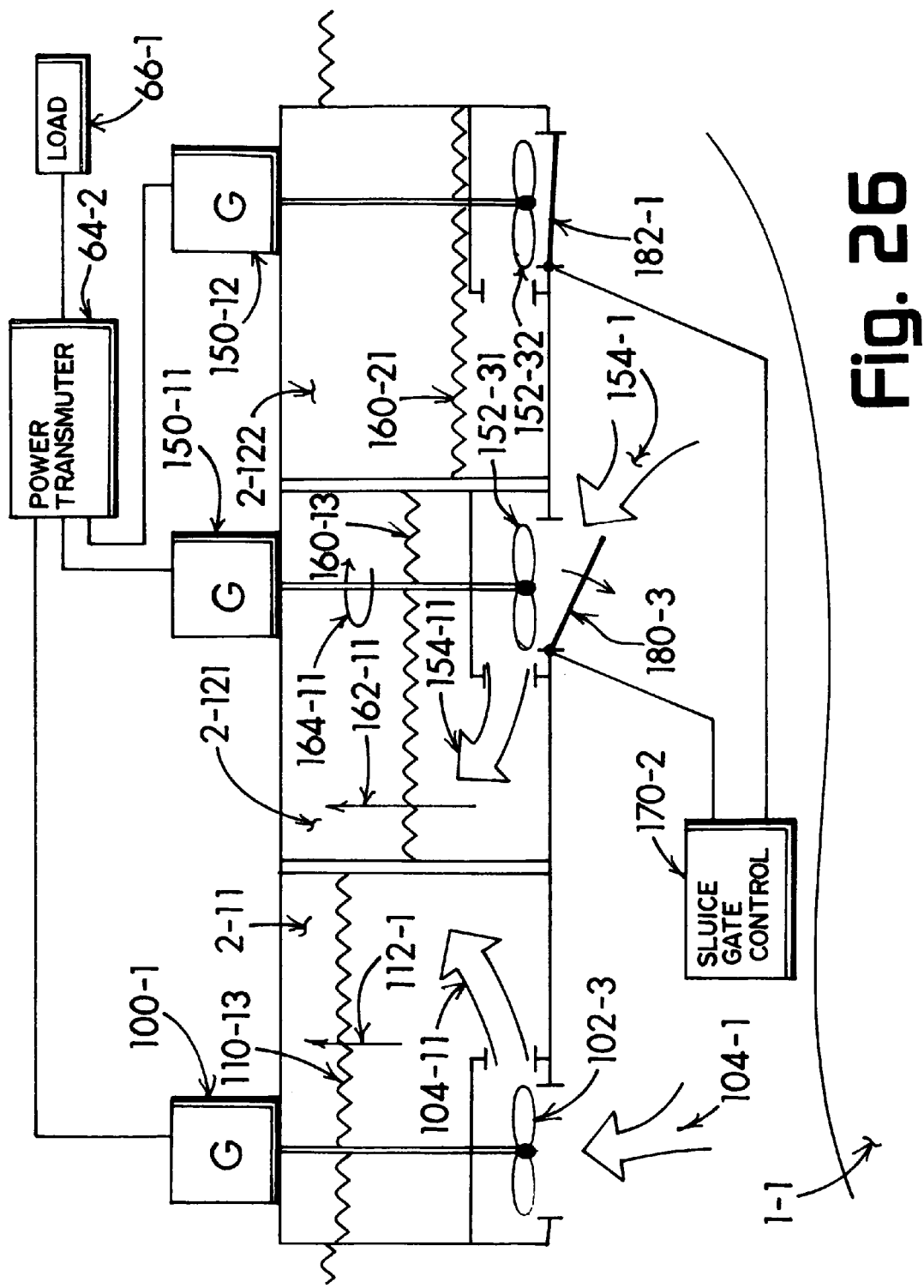

FIG. 25 shows the secondary regulator gate 180-1 fully closed and the secondary tidal basin level 160-12 slightly above a minimum tide level DCAA,DCAB by the amount of tidewater flow that entered 154-11 before the regulator gate 180-2 of FIG. 23 occurred. The tertiary regulator gate 182-1 is also closed assuring that the tertiary tidal basin level is maintained near DDAA,DDAB the minimum tide level with the empty volume 2-122 available as a potential source of tidal influx energy reserve for efficiently driving the generators when high tide slack time occurs and the secondary basin approaches the high-water level DCBA,DCBB. With the tide 108-2 rising 106-1, the forceful inflowing 104-1 of tide water DBAB urges the primary turbine 102-3 to rotate 114-1 the shaft member of the primary generator 100-1 to deliver electric energy to the power transmuter 64-2. The inflow 104-11 causes the primary tidal basin 2-11 level 110-12 to increase until reaching about 80% of the high tide level, whereupon the secondary regulator gate 180-3 is graduated open. A modulated inflowing of tidewater 154-1 urges the turbine 152-31 to produce rotation 164-11 of the generator 150-11 thereby delivering an increase of electric energy to the power transmuter 64-2 as the output from the primary generator 100-1 wanes. During this interval of operation, the water level 160-13 increases and as it approaches the oceanic tidewater level 108-2, it's output decreases. When the primary tidal basin water level 110-3 nears the tide water level 108-1 and the generator 100-1 output drops-off by a predetermined amount, the secondary regulator gate 180-3 is graduated open as shown in FIG. 26, enabling an influx of tidewater 154-1 into the available capacity 2-121 of the secondary tide basin.

Figure 27:
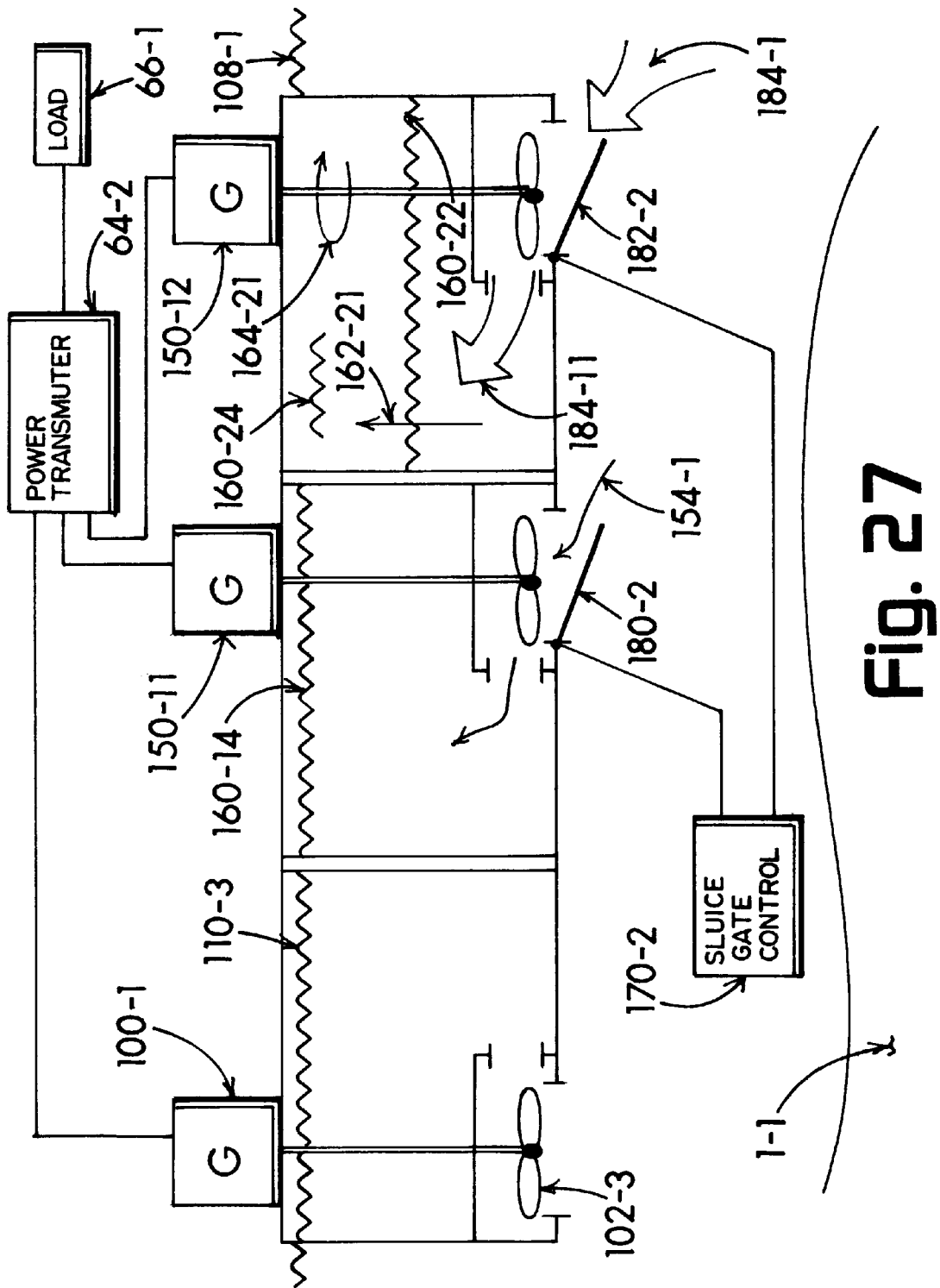

Engineering considerations assure that nearly empty DCAA,DCAB available space in the secondary tide basin 2-121 suffices as a reserve energy resource DC for at least the first half of the high-tide slack time DBDCA-DBCDA. When the turbine 154-1 performance dwindles as the secondary basin 2-121 fills to a virtual slack level DCBA, the tertiary regulator gate is graduated open in FIG. 27 by the sluice gate controller 170-2 to allow a modulated flow influx through the tertiary turbine 152-32 by utilizing the previously emptied volume DDAA,DDAB of tertiary tide basin 2-122 as the reserve energy resource DD for at least the second half DBCDA-DBDDB of the high-tide slack time.

Figure 28:
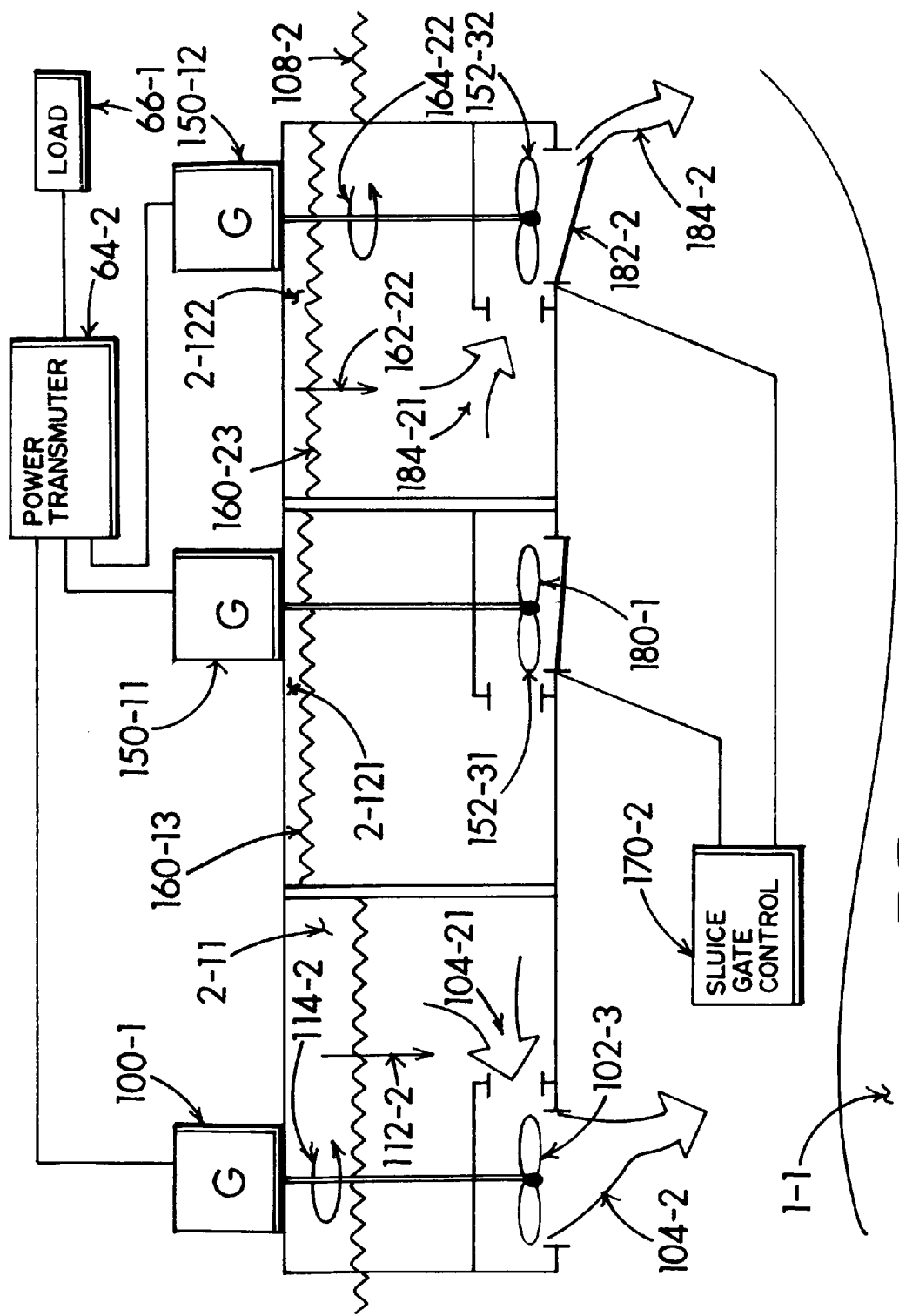
Figure 29:
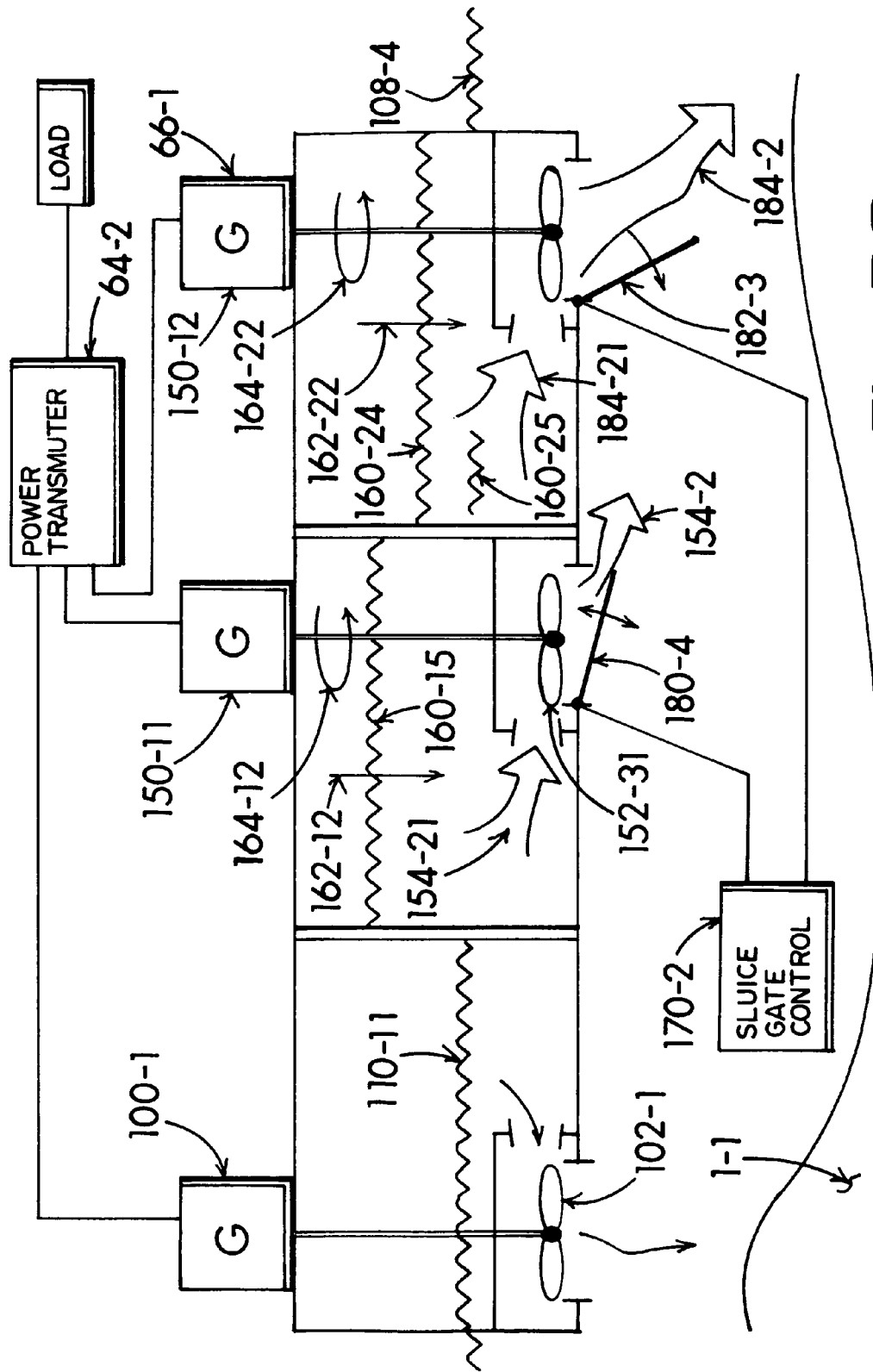

When the tide reflux occurs DBDDB-DBDCB the primary turbine 102-3 is operated by the outflow 104-2 of FIG. 28 which is the exhaust current 104-21 created as the oceanic tide 108-2 ebbs and the primary tidal basin 2-11 virtual tide level 110-13 goes down. As the ebb tide period climaxes and the slack-after-ebb time begins, the tertiary regulator gate 182-2 of FIG. 28 is graduated open by the sluice gate control 170-2 during an initial portion DBDCB-DBCDB of the slack water period to allow the secondary basin's held-back water to outflow through the turbine 182-2. The controller 170-2 regulates the regulator gate 182-2 to modulate the outflow of the tertiary tidal basin hydrodynamic reserves to an extent which balances the tapering-off of the primary turbine 102-3 performance as the water level in the primary tidal basin reaches the low-tide level.

As the tertiary tidal basin water reserves become depleted and the tertiary turbine 152-32 performance wanes, I show a graduated opening of the secondary regulator gate 1804 which allows an outflow 154-2, 154-21 of held-back water stored in the secondary tidal basin through the secondary turbine 152-31. Ordinarily this determined to occur DBCDB-DBDDC between the decline of the tertiary tidal basin outflow 184-2 and an onset of the primary tidal basin inflow 104-1 of FIG. 3.

The combination of the secondary tidal water basin and tertiary tidal water basin is to establish a reserve of sufficient hydrodynamic energy as controllably contained tidal influx and outflow to carry-over operation of the secondary turbine and tertiary turbine while the primary turbine is down, during the slack water tidal periods which represent about 50% the overall diurnal tide cycle. In a preferred implementation the secondary tidal basin and tertiary tidal basin each deliver a virtual tide that supports about 25% of the overall energy needs of the full diurnal tide cycle. The result is an about 100% electric power delivery throughout the diurnal cycle.

Presentment VI

Figure 30:
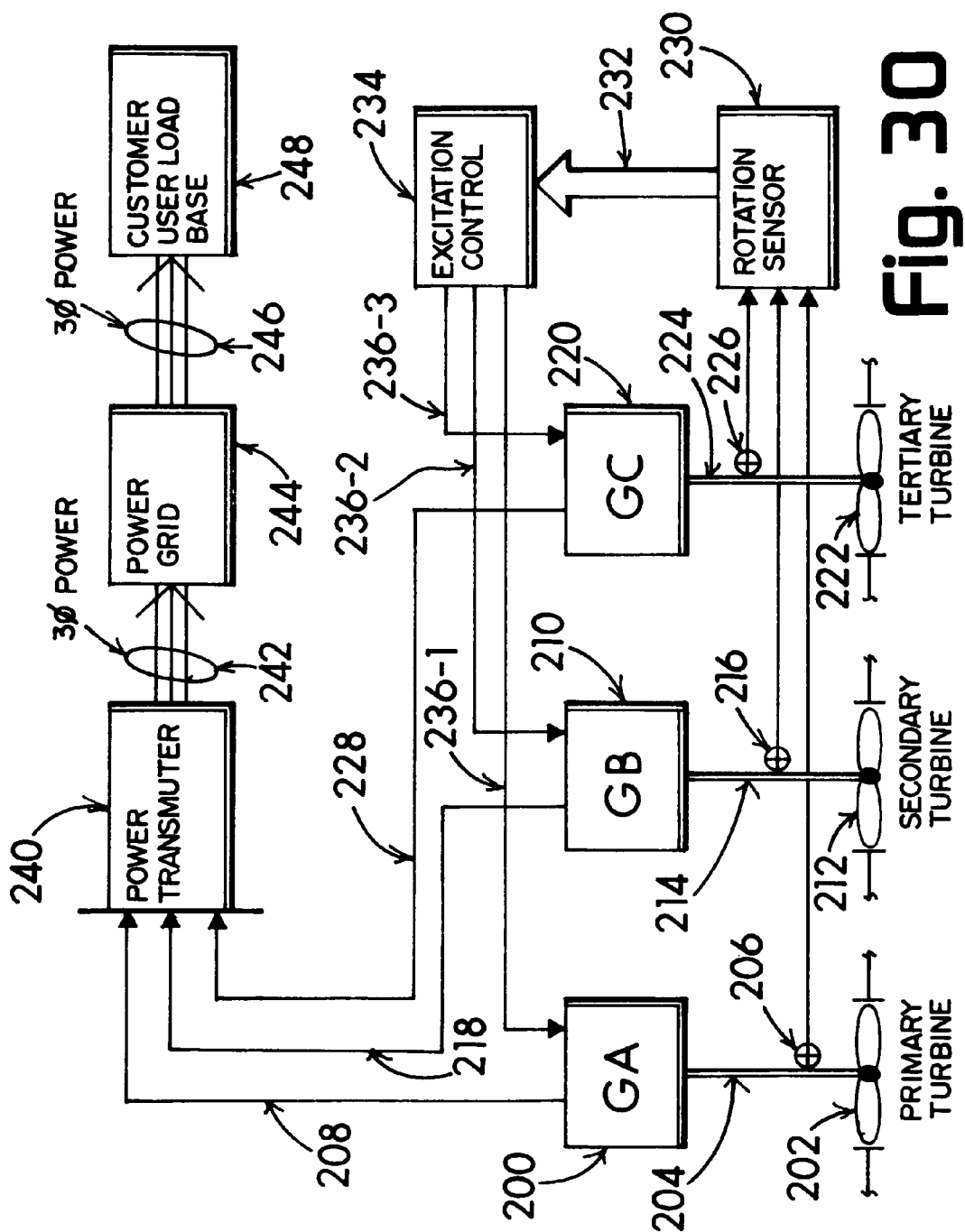
FIG. 30—Utilizing turbine speed determination to maintain optimal generator performance.

A preferred combination of three turbine and generator hookups appear in the schematic of FIG. 30. The desired result is for any combination of generator operation urged by the turbines to satisfy a formulation:

$$GA+GB+GC=PA$$

where: GA=output of primary generator 200
GB=output of secondary generator 210
GC=output of tertiary generator 220
PA=available power by user load 248

What this declares is that the primary turbine 202, secondary turbine 212 and tertiary turbine 222 may be variously excited so long as their net total delivered power equates to the load demand. This is the crux of my invention, that is to variously regulate the output of the several generators by utilizing rotation sensors 206,216,226 and processing the rotation data 230 to deliver a control signal to an excitation controller 234 for purpose of modulating the operation of each of the generators. The result is an about constant-sum level of power delivered 208,218,228 to a power transmuter 240 that processes usually d.c. power delivered by the generators' outputs into a constant (usually 60-Hz) frequency 3-phase power connectable 242 with a (commercial) power grid 244 and distributed 246 as 3-phase power to a customer user load base 248.

Practice Caveats

The gist of my invention is to provide an average level of energy delivery throughout a diurnal tidal cycle through storing water in a reserve tidal basin during periods of intense tidal current flow and subsequently releasing the stored water reserve as a virtual tide during periods of tidal slack water when insignificant natural tidal current avails itself to produce any meaningful power. By virtue of the diurnal cycle having a predictable regularity, upcoming power loading needs may be mostly anticipated and prepared for by gauging the stored water reserve in proportion to the expected demand. My invention provides accommodation of the non-synchronous natural relationship between the diurnal day cycle and the solar day cycle so as to provide relatively constant power availability no matter what the current phase relationship is between the two differing day cycles.

My invention intends to teach how the tide water energy may be presently utilized, routinely captured and subsequently reapplied to fill-in for regular gaps in conventional tidal power production. I describe tidal basins to include any sort of barrage enclosed water body, estuaries, dammed water bodies or other natural or man-made containment practiced as a civil engineering project. Turbines are to be broadly interpreted as any hydrodynamic engine capable of delivering mechanical energy derived from water current. Generators are machines for converting the turbine's mechanical energy, such as a rotating shaft, into electrical energy whether a.c. or d.c. in character. A power transmuter is any of a known variety of electrical apparatus capable of adapting the inconstant electric energy individually delivered by the generators into a constant-frequency alternating current suitable for commercial utility power utilization. My invention is most intentionally a producer of reliable and substantially constant level commercial quality electric power from the profoundly cyclic oceanic tidal wave energy source.

I realize that as the art-field unfolds, other elements, methods and interpretations may avail themselves for utilization by a practitioner. This invention must be broadly read for its essence and not narrowly dependent upon a practitioner's mere affinity for implementation preferences, embodiment choices, hindsight or similar prejudices. The scope of this invention extends to the comprehensive practice of the schematized methods and illustrative teachings I provide and presently claim as basic to my invention's novelty and practicable utility.

I claim:

1. A hydroelectric power generation method utilizing an oceanic source of tidal flood and ebb current energy comprising:
   first channeling the oceanic tidal current to drive a turbine apparatus as it floods and ebbs through a primary tideway coursing between the oceanic source and a primary tidal basin;
   first gating the tidal current flow through a secondary tideway coursing between the oceanic source and a secondary tidal basin;
   first predicating a closure of the first regulator gate maintaining the secondary tidal basin near a low slack tide level;
   first urging a proportionated opening of the first regulator gate allowing a delayed influx of tidal flood current into the secondary tidal basin to enable continued drive of the turbine apparatus during high slack tide;
   second predicating a proportionated closure of first regulator gate during a subsequent period of substantial oceanic ebb current through the primary tideway and maintaining the secondary tidal basin near a high slack tide level;
   second urging the proportionated opening of the first regulator gate allowing a delayed reflux of tidal ebb current from the secondary tidal basin to enable the continued drive of the turbine apparatus during low slack tide;
   driving a generator apparatus by the turbine apparatus for producing electrical power to a distribution system; and,
   whereby during dynamic periods of oceanic tide flood and ebb the turbine apparatus is operated by a waxing and waning of the tidal drift current through the primary tideway coupled with a primary basin and during oceanic slack water periods continued operation of the turbine apparatus is maintained by a determinedly delayed first regulator gate controlled influx and reflux of tidal drift energy channeled between the secondary tidal basin, a turbine apparatus and the oceanic source while the turbine apparatus drives a generator which produces a substantially constant level of electric power independent of the oceanic tidal current's diurnal phase.

2. The method of claim 1 comprising further steps of:
   first configurating the primary tidal basin as a first artificial concavity at least partially surrounded by a barrage having the primary tideway coupled with the source of oceanic tidal energy;
   second configurating the secondary tidal basin as a second artificial concavity at least partially surrounded by a barrage and having the first regulator gate controlled secondary tideway coupled with the source of oceanic tidal energy; and,
   routing the tidal current drift through each of the primary tideway and the secondary tideway for effectually driving the turbine apparatus.

3. The system of claim 1 comprising further steps of:
   first reckoning an onset of the oceanic tidal source reflux during a period of high-tide slack water;
   maximizing an inflowing of tidal water through the secondary tideway to topmost the water level in the secondary basin prior to the first reckoning the onset of the oceanic tidal source ebb tide quadrant;
   second reckoning an onset of the oceanic tidal source influx during a period of low-tide slack water;
   maximizing an outflowing of tidal water through the secondary tideway to bottommost the water level in the secondary basin prior to the second reckoning the onset of the oceanic source flood tide quadrant;
   whereby, fully replenishing the secondary basin before onset of the oceanic ebb tide quadrant and fully depleting the secondary basin before onset of the oceanic flood tide quadrant provides an optimal level of energy potential availability from the secondary basin to maintain the turbine apparatus operational performance throughout the usual two slack water quadrants of a diurnal tide cycle.

4. The method of claim 3 comprising a further step of:
   modulating the proportioned opening and closing of the first regulator gate to urge a graduated change of influx and reflux of the delayed tidal current capacity of the secondary basin in a determinable proportion to a waxing and waning of the natural tidal drift of the oceanic tide source; and,
   whereby, the natural tidal current and delayed tidal current's work function exchange through the primary and secondary tideways are combined to urge a corroborant level of hydrodynamic energy conversion through the turbine apparatus, resulting in a stabile production of hydroelectric power throughout a diurnal tide cycle.

5. The method of claim 1 further comprising steps of:
   monitoring speed and set of the oceanic tidal current flow through the primary tideway;
   first graduating the first opening of the first regulator gate in proportion to a first measured decrease in the oceanic tidal flood current inflow through the primary tideway;
   second graduating the second closing of the first regulator gate in proportion to a second measured increase in the oceanic tidal reflux current outflow through the primary tideway;
   third graduating the second opening of the first regulator gate in proportion to a third measured decrease in the oceanic tidal reflux current outflow through the primary tideway;

fourth graduating the second closing of the first regulator gate in proportion to a fourth measured increase in the oceanic tidal flood current inflow through the primary tideway; and, whereby, controlled graduated opening and closing of the first regulator gate urges a nearly constant level of tidal energy conversion by the turbine apparatus throughout a diurnal tide cycle.

6. The method of claim 1 comprising further steps of:

first measuring tidal drift current through the primary tideway;

first regulating a first opening of the first regulator gate in proportion to a first measured decrease of the oceanic tidal current through the primary tideway;

second regulating a first closing of the first regulator gate in proportion to a measured increase of the oceanic tidal current through the primary tideway; and, maintaining the first closure of the first regulator gate during the period of substantial oceanic tidal current flow through the primary tideway.

7. The method of claim 1 comprising further steps of:

first reckoning an onset of the oceanic tidal source reflux during a period of high-tide slack water;

maximizing an inflowing of tidal water through the secondary tideway to replenish the water level in the secondary basin prior to the onset of the oceanic source ebb tide quadrant;

second reckoning an onset of the oceanic tidal source influx during a period of low-tide slack water;

maximizing an outflowing of tidal water through the secondary tideway to deplete the water level in the secondary basin prior to the onset of the oceanic source flood tide quadrant;

whereby, fully replenishing the secondary basin before onset of the oceanic ebb tide quadrant and fully depleting the secondary basin before onset of the oceanic flood tide quadrant provides a maximal level of energy potential availability from the secondary basin to maintain the turbine apparatus operational performance throughout the usual two slack water quadrants of a diurnal tide cycle.

8. The method of claim 1 comprising further steps of:

determining energy demand loading of the turbine apparatus by the generator apparatus;

shunting the primary tideway with a first bypass tideway including a second regulator gate;

shunting the secondary tideway with a second bypass tideway including a third regulator gate;

partially opening the second regulator gate during periods of diminished energy demands to assure mostly filling the primary basin during the period of tidal influx and conversely to assure mostly emptying the primary basin during the period of tidal reflux;

partially opening the third regulator gate during the periods of the diminished energy demands to assure mostly filling the secondary basin during the period of the oceanic tide's slack after flood and conversely to assure mostly emptying the secondary basin during the period of the oceanic tide's slack after ebb; and, whereby during the predetermined periods of diminished energy demands the shunting of the primary and secondary tideways with the first and second bypass tideways serve to maintain a near-maximum level of reserve energy storage potential by the primary and secondary basins in subsequent phases of tidal energy demands.

9. The method of claim 1 comprising further steps of:

shunting the primary tideway with a first bypass tideway including a second regulator gate;

shunting the secondary tideway with a second bypass tideway including a third regulator gate;

profiling anticipated energy usage during a forthcoming quadrant of a usual diurnal tide cycle;

weighting the profile to include at least one determinable datum source selected from demand history, tide history, climatic conditions, day of week, time of day, season, and customer characteristic and energy usage;

determining a harmonious operation of one of the first regulator gate and the second regulator gate in order to shunt sufficient tidal energy around the turbine apparatus to attain an optimum level of potential energy capacity availability for the operation of the turbine apparatus during a next contiguous quadrant of the diurnal cycle; and, whereby an optimum level of potential energy capacity for sustained operation of the turbine apparatus may be determined by the profiling of anticipated energy usage in order to allow the reservoirs to either one of fill and empty to a maximal extent during an immediate phase of tidal cycle to provide a maximum of potential energy reserve for maintaining operation of the turbine apparatus during the next phase of the tidal cycle.

10. The method of claim 1 comprising further steps of:

third channeling the oceanic tidal current to drive the turbine apparatus by tidal current flow through a tertiary tideway coursing between the oceanic source and a tertiary tidal basin;

second controlling tidal current flow through the tertiary tideway by a second regulator gate;

determining anticipated energy demands placed on the turbine apparatus which may occur during at least a portion of a next-contiguous diurnal tide cycle;

proportioning the parallel operation of the tertiary tidal basin with one of the primary tidal basin and the secondary tidal basin during the next-contiguous diurnal tide cycle by urging a timely opening and closure of the second regulator gate; and, whereby, when anticipated energy demands are determined to likely increase during a portion of the next-contiguous diurnal tide cycle, the second regulator gate's determinately controlled parallel routing of the tertiary tidal basin's reserve of energy capacity through the tertiary tideway may assist one of the primary tidal basin and the secondary tidal basin to produce continuous and near full-capacity operation of the turbine apparatus.

11. A hydroelectric power generation system utilizing tidal current energy to produce energy throughout the flood, ebb and usual two slack periods of oceanic tide, comprising:

a primary tidal basin including a first tideway coupled with a source of oceanic tide;

a turbine apparatus first urged by a primary tidal current flowing through the first tideway;

a secondary tidal basin fitted with a second tideway coupled with the turbine apparatus and the source of oceanic tide;

a first regulator gate fitted to the second tideway to gradate a flowing of secondary tidal current therethrough;

the turbine apparatus second urged by the secondary tidal current flowing through the second tideway;

first predicating the secondary tidal basin near low slack tide level;

first closing the first regulator gate during an influx period of oceanic flood tide;

first opening the first regulator gate during a period of high slack tide to gradate a delayed tidal current influx into the secondary tidal basin;

second closing the first regulator gate during a reflux period of oceanic ebb tide;

second predicating the secondary tidal basin near high slack tide level;

second opening the first regulator gate during a period of low slack tide to gradate a delayed tidal current reflux from the secondary tidal basin;

driving a generator by the turbine apparatus for producing electrical power to a distribution system; and, whereby, the primary tidal basin receives an inflow of tidal current during periods of oceanic tide flood and an outflow of tidal current during periods of oceanic tide ebb and the secondary tidal basin receives a delayed inflow of the virtual tidal current during periods of oceanic slack after flood and a delayed outflow of the virtual tidal current during periods of oceanic slack after ebb by proportional control of the open and closed states of the first regulator gate in the secondary tideway with a combined drift of the tideway currents providing a substantially constant source of turbine power.

12. The system of claim 11 comprising further steps of:

third predicating a period of high-tide slack water;

first reckoning an onset of the oceanic tidal source reflux;

maximizing inflow of tidal water through the secondary tideway to replenish the water in the secondary basin to a preferred high level prior to the onset of the oceanic source ebb tide quadrant;

fourth predicating a period of low-tide slack water;

second reckoning an onset of the oceanic tidal source influx;

maximizing an outflowing of tidal water through the secondary tideway to deplete the water in the secondary basin a preferred low level prior to the onset of the oceanic source flood tide quadrant;

whereby, fully replenishing the secondary basin to the preferred high level before onset of the oceanic ebb tide quadrant and fully depleting the secondary basin to the preferred low level before onset of the oceanic flood tide quadrant provides a maximal level of energy potential availability from the secondary basin to maintain the turbine apparatus operational performance throughout the usual two slack water quadrants of a diurnal tide cycle.

13. The system of claim 11 comprising further steps of:

first shunting the primary tideway and the turbine apparatus with a first bypass sluiceway including a first sluice-gate for first regulating a first circumfluous exchange of tidal flow between the primary tidal basin and the oceanic tide source;

second shunting the secondary tideway and the turbine apparatus with a second bypass sluiceway including a second sluice-gate for second regulating a second circumfluous exchange of tidal flow between the secondary tidal basin and the oceanic tide source;

reckoning forthcoming electric power demand based on at least one of time of solar day, projected energy demand, measured demand, remaining tidal basin reserve and usage history;

third opening at least one of the first sluice-gate and the second sluice-gate when the forthcoming power demand is lesser than a predetermined level;

whereby a desirous effect of the first shunting is to more fully exhaust the primary tidal basin level preceding onset of the tidal influx from the oceanic tidal source and fully top-off the influx reception energy reserve of the primary tidal basin and otherwise the first shunting is to more fully fill the primary tidal basin level preceding onset of the reflux of the oceanic tidal source and the second shunting is to more fully exhaust the secondary tidal basin level preceding the first closing of the first regulator gate and fully top-off the secondary tidal basin level preceding the first opening of the first regulator gate resulting in resetting a full capacity the primary tidal basin and the secondary tidal basin with a maximal energy potential prior to changes in tidal drift during the diurnal tide cycle.

14. The system of claim 11 comprising further steps of:

first determining drift of the primary tidal current;

second determining drift of the secondary tidal current;

first summing the first determined drift and the second determined drift;

regulating closure of the first regulator gate proportional to a value increase in the first sum;

regulating opening of the first regulator gate proportional to a value decrease in the first sum; and, whereby, a summation of the primary tidal current flowing through the primary tideway and the secondary tidal current flowing through the secondary tideway is regulated to yield a nearly constant hydrodynamic force for excitation of the turbine apparatus.

15. The system of claim 11 comprising further steps of:

a tertiary tidal basin fitted with a tertiary tideway coupled with the source of oceanic tide;

a controllable second regulator gate fitted in the tertiary tideway to regulate flow of tertiary tidal current;

the turbine apparatus third urged by the tertiary tidal current flowing through the tertiary tideway;

first metering the first closing of the first regulator gate in proportion to an influx tide drift increase through the primary tideway;

the second closing of the second regulator gate gauged to fully occur at the onset of the oceanic influx tide to maintain a nearly ebb tide level in the tertiary tide basin; and, alternating usage of the secondary tide basin and the tertiary tide basin in combination with the primary tide basin during successive diurnal tide cycles to assure that the turbine apparatus is supplied with a substantially uniform and corroborant source of hydromechanical energy; and, whereby the primary tidal basin provides a bulk of the hydrodynamic energy during tidal quadrants of tidal influx and reflux and otherwise the corroborant usage of the secondary tidal basin and the tertiary tidal basin may be alternately exchanged during successive diurnal tide cycles to assure that maximal hydrodynamic energy reserves are available for supplementation of the hydrodynamic energy capability of the primary tidal basin.

16. The system of claim 11 comprising further steps of:

first metering the first closing of the first regulator gate in proportion to an influx tide drift increase through the primary tideway;

second metering the first opening of the first regulator gate in proportion to the influx tide drift decrease through the primary tideway preceding the oceanic low tide slack water;

third metering the second closing of the first regulator gate in proportion to a reflux tide drift increase through the primary tideway;

fourth metering the second opening of the first regulator gate in proportion to the reflux tide drift decrease through the primary tideway preceding the oceanic high tide slack water;

whereby graduating the metered opening and closing of the first regulator gate in proportion to the decrease and increase in the primary tideway drift current an about constant combined rate of tidal drift current may be maintained through the primary and secondary tideways urges the turbine apparatus with a corroborant source of substantially steady hydromechanical energy for driving the generator apparatus.

17. A hydroelectric power generation method sourced by naturally recurrent oceanic tide flood and ebb water energy comprising:

a primary tidal basin and a secondary tidal basin each comprising an artificial concavity at least partially contained by a barrage;

first fitting the primary tidal basin with a primary tideway coupled to a source of oceanic tide water;

first routing a primary tidal flood and ebb current through the primary tideway to drive a turbine apparatus as the changing tide flows into or discharges from the primary tidal basin;

first measuring tidal drift current through the primary tideway;

second fitting the secondary tidal basin with a secondary tideway including a first regulator gate coupled to the source of oceanic tide water;

first modulating a secondary tidal current second routed through the secondary tideway with the first regulator gate;

first proportionately closing the first regulator gate during a first measured increase of an influx of the primary tidal current flow;

first proportionately opening the first regulator gate during a first measured decrease of the influx of the primary tidal current flow;

second driving the turbine apparatus with a first inflow of the secondary tidal current;

second proportionately closing the first regulator gate during the first measured increase of a reflux of the primary tidal current flow;

third driving the turbine apparatus with the reflux of the primary tidal current;

second proportionately opening the first regulator gate during the first measured decrease of the reflux of the primary tidal current flow;

fourth driving the turbine apparatus with a first outflow of the secondary tidal current;

repeating the first closing of the first regulator gate when the oceanic tide flood current flow recurs; and, driving a generator with the turbine apparatus to produce a substantially constant level of electrical power through all four phases of a tidal cycle;

whereby the natural flood and ebb of the oceanic tide current energy is captured to primarily drive the turbine apparatus with a complementary reserve of energy capacity to secondarily drive the turbine apparatus provided by the first regulator gate enablement of the secondary tideway inflow into the secondary basin during a period of oceanic slack after flood and conversely to enable tidal outflow from the secondary basin during a period of oceanic slack after ebb, resulting in a substantially constant source of energy throughout the oceanic tide cycle.

18. The method of claim 17 comprising further steps of:

determining a demand of electrical power loading reflected on the turbine apparatus by the generator is less than the hydrodynamic capacity of the turbine apparatus and the tidal basins;

first utilizing the excess hydrodynamic capacity to transfer additional water into at least the secondary tidal basin during the oceanic flood tide and slack after flood quadrants;

second utilizing the excess hydrodynamic capacity to transfer additional water from at least the secondary tidal basin during the oceanic ebb tide and slack after ebb quadrants; and, whereby the utilization of the excess hydrodynamic capacity to transfer tide water levels in at least the secondary tidal basin to a higher or else lower level than attainable by the natural flow of tidal water stores additional tidal energy reserves that may be released to drive the turbine apparatus while periods of increased electric power demand may occur and especially during the slack tide quadrants.

19. The method of claim 17 comprising further steps of:

first reckoning an onset of the oceanic tidal source reflux during a period of high-tide slack water, maximizing an inflowing of tidal water through the secondary tideway to replenish the water level in the secondary basin prior to the onset of the oceanic source ebb tide quadrant;

second reckoning an onset of the oceanic tidal source influx during a period of low-tide slack water;

maximizing an outflowing of tidal water through the secondary tideway to deplete the water level in the secondary basin prior to the onset of the oceanic source flood tide quadrant;

whereby, fully replenishing the secondary basin before onset of the oceanic ebb tide quadrant and fully depleting the secondary basin before onset of the oceanic flood tide quadrant provides a maximal level of energy potential availability from the secondary basin to maintain the turbine apparatus operational performance throughout the usual two slack water quadrants of a diurnal tide cycle.

\* \* \* \* \*